United States Patent
Rakib et al.

(10) Patent No.: US 7,089,577 B1
(45) Date of Patent: Aug. 8, 2006

(54) PROCESS FOR SUPPLYING VIDEO-ON-DEMAND AND OTHER REQUESTED PROGRAMS AND SERVICES FROM A HEADEND

(75) Inventors: Selim Shlomo Rakib, Cupertino, CA (US); Fabrice Michel Raymond Quinard, San Jose, CA (US); Peter Albert Monta, Palo Alto, CA (US)

(73) Assignee: Terayon Communication Systems, Inc., Santa Clara, CA (US)

(*) Notice: Subject to any disclaimer, the term of this patent is extended or adjusted under 35 U.S.C. 154(b) by 1000 days.

(21) Appl. No.: 09/602,779

(22) Filed: Jun. 23, 2000

Related U.S. Application Data

(63) Continuation-in-part of application No. 09/483,681, filed on Jan. 14, 2000, now abandoned.

(51) Int. Cl.
*H04N 7/173* (2006.01)

(52) U.S. Cl. .............................. 725/87; 725/91; 725/93; 725/95; 725/100; 725/101; 725/103; 725/104

(58) Field of Classification Search .................. 725/27, 725/86, 87, 91, 93, 95, 88, 89, 90, 92, 94, 725/96, 97–104
See application file for complete search history.

(56) References Cited

U.S. PATENT DOCUMENTS

| | | | |
|---|---|---|---|
| 4,829,569 A | 5/1989 | Seth-Smith et al. | 380/10 |
| 4,894,789 A | 1/1990 | Yee | 364/521 |
| 5,093,718 A | 3/1992 | Hoarty et al. | 358/84 |
| 5,130,983 A | 7/1992 | Heffner, III | 370/85.8 |
| 5,133,079 A | 7/1992 | Ballantyne et al. | 455/4.1 |
| 5,195,092 A | 3/1993 | Wilson et al. | 370/94.2 |
| 5,200,993 A | 4/1993 | Wheeler et al. | 379/96 |
| 5,247,347 A | 9/1993 | Litteral et al. | 358/85 |
| 5,351,075 A | 9/1994 | Herz et al. | 348/1 |
| 5,373,288 A | 12/1994 | Blahut | 340/825.08 |
| 5,408,465 A | 4/1995 | Gusella et al. | 370/17 |
| 5,512,936 A | 4/1996 | Burton et al. | 348/11 |
| 5,550,578 A | 8/1996 | Hoarty et al. | 348/7 |
| 5,572,517 A | 11/1996 | Safadi | 370/50 |
| 5,572,528 A | 11/1996 | Shuen | 370/85.13 |
| RE35,774 E | 4/1998 | Moura et al. | 348/12 |
| 5,815,662 A | 9/1998 | Ong | 395/200.47 |
| 5,818,512 A | 10/1998 | Fuller | 348/8 |
| 5,819,036 A * | 10/1998 | Adams et al. | 709/203 |
| 5,822,676 A | 10/1998 | Hayashi et al. | 455/4.2 |
| 5,828,655 A | 10/1998 | Moura et al. | 370/236 |
| 5,878,277 A | 3/1999 | Ohta | 395/857 |
| 6,014,694 A | 1/2000 | Aharoni et al. | 709/219 |
| 6,018,359 A | 1/2000 | Kermode et al. | 348/7 |
| 6,046,760 A | 4/2000 | Jun | 348/7 |
| 6,081,533 A * | 6/2000 | Laubach et al. | 370/421 |

(Continued)

*Primary Examiner*—John Miller
*Assistant Examiner*—Annan Q Shang
(74) *Attorney, Agent, or Firm*—Ronald Craig Fish; Ronald Craig Fish, a Law Corporation

(57) ABSTRACT

A system for providing video-on-demand service, broadband internet access and other broadband services over T-carrier systems including a pull multiplexer cherrypicker at the head end is disclosed. The pull multiplexer receives upstream requests and cull out MPEG or other compressed video packets, IP packets and other data packet types to satisfy the requests or to send pushed programming downstream. The downstream can be DSL or HFC. Each customer has a cable modem, DSL modem or a gateway which interfaces multiple signal sources to a LAN to which settop decoders, digital phones, personal computers, digital FAX machines, video cameras, digital VCRs etc. can be attached. Each gateway can coupled the LAN to a DSL line or HFC through a cable modem or a satellite dish through a satellite transceiver. A PSTN and conventional TV antenna interface is also provided.

10 Claims, 12 Drawing Sheets

U.S. PATENT DOCUMENTS

| | | | | |
|---|---|---|---|---|
| 6,154,772 A | * | 11/2000 | Dunn et al. | 725/114 |
| 6,216,171 B1 | * | 4/2001 | Isono et al. | 709/250 |
| 6,249,320 B1 | * | 6/2001 | Schneidewend et al. | 348/569 |
| 6,272,151 B1 | * | 8/2001 | Gupta et al. | 370/489 |
| 6,360,075 B1 | * | 3/2002 | Fischer et al. | 455/3.01 |
| 6,385,565 B1 | * | 5/2002 | Anderson et al. | 703/18 |
| 6,385,647 B1 | * | 5/2002 | Willis et al. | 709/217 |
| 6,385,656 B1 | * | 5/2002 | Appelman | 709/247 |
| 6,418,169 B1 | * | 7/2002 | Datari | 375/240.28 |
| 6,483,543 B1 | * | 11/2002 | Zhang et al. | 348/390.1 |
| 6,496,982 B1 | * | 12/2002 | Johansson et al. | 725/121 |
| 6,542,500 B1 | * | 4/2003 | Gerszberg et al. | 370/354 |
| 6,543,053 B1 | * | 4/2003 | Li et al. | 725/88 |
| 6,553,568 B1 | * | 4/2003 | Fijolek et al. | 725/111 |
| 6,571,296 B1 | * | 5/2003 | Dillon | 709/250 |
| 6,728,887 B1 | * | 4/2004 | Dziekan et al. | 713/201 |
| 2002/0013948 A1 | * | 1/2002 | Aguayo, Jr. et al. | |

* cited by examiner

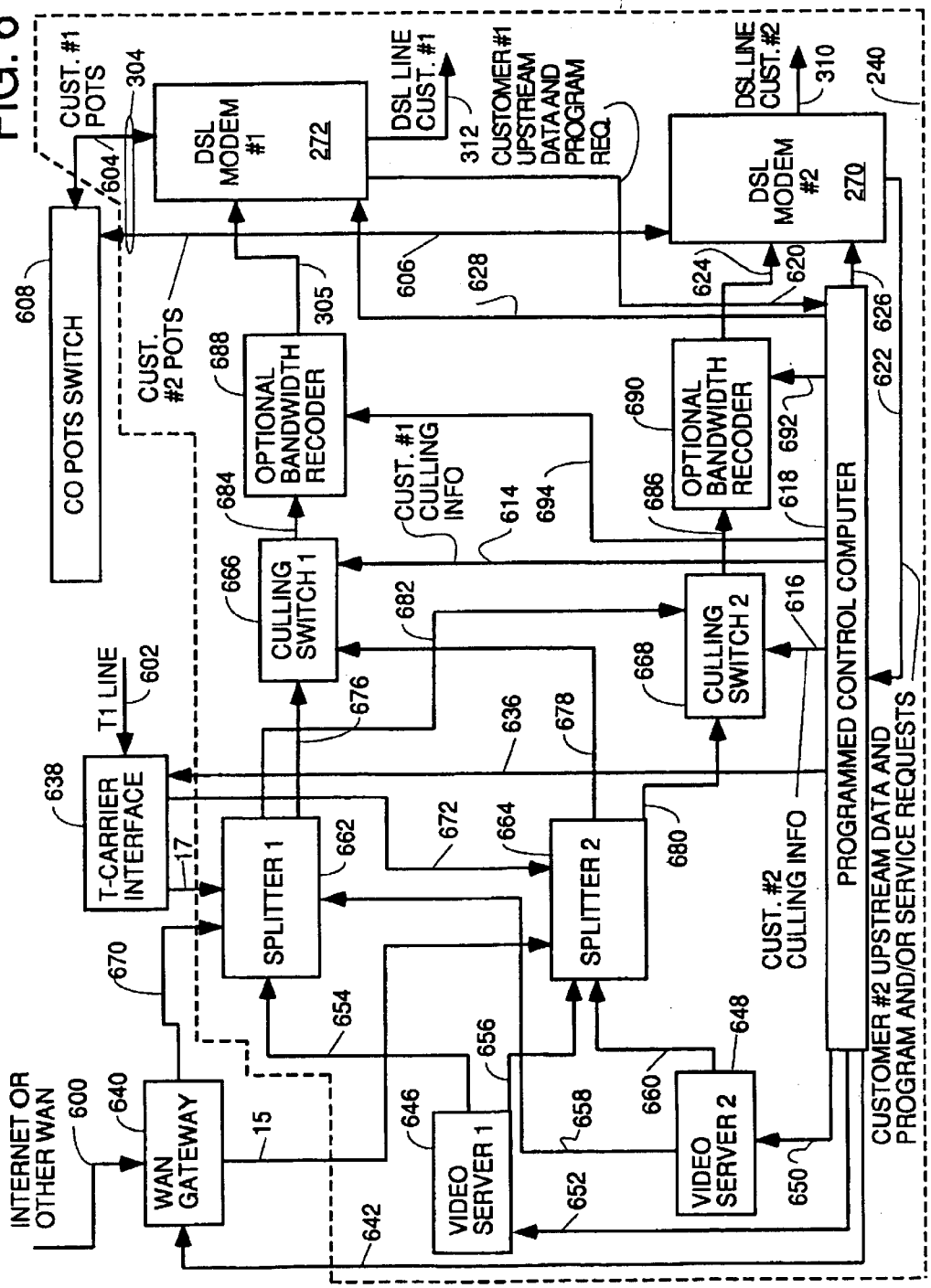

PROCESS FOR SUPPLYING VIDEO-ON-DEMAND AND OTHER REQUESTED PROGRAMS AND SERVICES FROM A HEADEND

This application is a CIP of U.S. Ser. No. 09/483,681 filed Jan. 4, 2000, now abandoned.

FIELD OF USE

The invention finds utility in the head end offices of cable TV operators, ADSL system head end and potentially wireless head ends for delivery of video-on-demand programming in digital format as well as other services such as digital telephony or wideband internet access.

BACKGROUND OF THE INVENTION

This is a continuation-in-part of a co-pending U.S. patent application entitled HOME NETWORK FOR ORDERING AND DELIVERY OF VIDEO ON DEMAND, TELEPHONE AND OTHER DIGITAL SERVICES, filed Jan. 14, 2000, Ser. No. 09/483,681 which is hereby incorporated by reference. Most cable TV systems in the prior art have been broadcast only where individual programs were modulated onto 6 MHz bandwidth analog RF carriers that were frequency division multiplexed. As the internet became more popular and telephone services became deregulated and other digital services became more popular, there has arisen the notion of delivery of digital data over cable TV systems in a portion of the bandwidth unused by the analog CATV programs. This gave rise to cable modems.

Video-on-demand services have been known in hotel television systems for several years. Video-on-demand services allow a user to select a program to view and have the video and audio data of that program transmitted to her television set. Examples of such systems include: U.S. Pat. No. 6,057,832 disclosing a video on demand system with a fast play and a regular play mode; U.S. Pat. No. 6,055,560 disclosing an interactive video-on-demand system that supports functions normally only found on a VCR such as rewind, stop, fast forward etc.; U.S. Pat. No. 6,055,314 which discloses a system for secure purchase and delivery of video content programs over distribution networks and DVDs involving downloading of decryption keys from the video source when a program is ordered and paid for; U.S. Pat. No. 6,049,823 disclosing an interactive video-on-demand to deliver interactive multimedia services to a community of users through a LAN or TV over an interactive TV channel; U.S. Pat. No. 6,025,868 disclosing a pay-per-play system including a high-capacity storage medium; U.S. Pat. No. 6,020,912 disclosing a video-on-demand system having a server station and a user station with the server stations being able to transmit a requested video program in normal, fast forward, slow, rewind or pause modes; U.S. Pat. No. 5,945,987 teaching an interactive video-on-demand network system that allows users to group together trailers to review at their own speed and then order the program directly from the trailer; U.S. Pat. No. 5,935,206 teaching a server that provides access to digital video movies for viewing on demand using a bandwidth allocation scheme that compares the number of requests for a program to a threshold and then, under some circumstances of high demand makes another copy of the video movie on another disk where the original disk does not have the bandwidth to serve the movie to all requesters; U.S. Pat. No. 5,926,205 teaching a video-on-demand system that provides access to a video program by partitioning the program into an ordered sequence of N segments and provides subscribers concurrent access to each of the N segments; U.S. Pat. No. 5,802,283 teaching a public switched telephone network for providing information from multimedia information servers to individual telephone subscribers via a central office that interfaces to the multimedia server(s) and receives subscriber requests and including a gateway for conveying routing data and a switch for routing the multimedia data from the server to the requesting subscriber over first, second and third signal channels of an ADSL link to the subscriber.

Video-on-demand on cable TV systems to receive requests from cable subsribers for video programs or services such as high speed internet access or access to T1 or other high speed digital telephony services have not yet completed development. Such systems receive upstream requests and deliver requested video programs with associated audio and other data, as well as bidirectional delivery of internet protocol packets from LAN or WAN sources coupled to the head end bidirectional delivery of telephony data packets to and from T1 or other high speed lines of the public service telephony network. A need has arisen for a video-on-demand service over cable TV systems as well as delivery of other services such as wideband internet and T1 telephony access over cable TV systems.

SUMMARY OF THE INVENTION

A genus of video-on-demand pull technology cable TV systems is defined herein. Each system includes one or more "pull multiplexers" and one or more video stream inputs and one or more transmitters or transceivers at the head end, and a plurality of customer premises distributed along the downstream transmission medium.

A "pull multiplexer" is defined as a head end "cherry picker" multiplexer that has circuitry and/or software which functions to, at least:

receive upstream program and/or service requests, typically video program requests or requests for internet access etc., from the customer premises (or at least some of them if an array of pull multiplexers are used to divide up the work);

map the requests to program identifier codes (hereafter PID) that correspond to PIDs that will be in data packets encoding the desired program(s) and any associated audio, graphic, text or other auxiliary data and, in some embodiments, communicate PIDs and other packet identifying data to one or more video servers, and, in some embodiments, WAN servers and T-carrier interface circuits, to cause them to output data encoding requested programs and "pushed" programs to be sent regardless of requests;

receive one or more streams of compressed data packets (typically MPEG II but any compression scheme may be used) encoding a plurality of programs and/or services (such as telephony or internet access) and cull out those packets that have program identifier codes, IP addresses or other packet identifier information in the packet headers that identify the requested program or service data in the payload of the packet as well as data packets associated with the requested program(s) and/or services encoding any other audio, graphic, text or other auxiliary data packets that are to be used with the the requested program or service;

assemble the data packets culled out from the input streams into one or more output streams with each output stream containing the data packets for multiple requested programs and/or services;

outputting one output stream to each transmitter, transceiver or modem coupled to the downstream medium for transmission on a "logical channel" and "subchannel" ("logical channel" means any data path which carries one or more sets of data, each logical channel being multiplexed or otherwise physically or logically separated from other data being transmitted to another entity or in another direction on another logical channel, each set of data being carried on a subchannel of a logical channel also being multiplexed in any known way from the other sets of data being transmitted on the same logical channel) such that each logical channel carries in its subchannels one or more components of one or more requested programs and/or services and wherein, in the preferred embodiment, the collection of all such logical channels and subchannels carries only requested program(s) and/or service(s) (in alternative embodiments, some of the program slots or subchannels in selected or predetermined logical channels will carry data of programs and/or services that have not been specifically requested but which are high demand and which almost always will have users such as CNN or ESPN); and send downstream messages as to which channel(s) and subchannel(s) the program(s) and/or service(s) (in both requested and requested plus broadcast type embodiments) data will be transmitted on and the PIDs, IP addresses or other identifier information in the headers of the data packets that are to be used at the customer premises to filter out the requested programs and/or services and, in some embodiments, the broadcast high demand programs and/or services (in embodiments where there is not a shared downstream medium such as DSL lines to each customer, the filtering criteria can be dispensed with and the downstream messages only indicate which channels and subchannels contain the requested data).

Any circuitry and/or software that can accomplish these functions in the pull multiplexer are acceptable to practice the invention. Multiple specific examples of such systems within the genus of the invention are included within the detailed description section below.

The above definition of the characteristics of the "pull multiplexer" genus assumes that the downstream media has sufficient bandwidth that all the requested (and possibly broadcast) programs and/or services can be transmitted without any downward adjustment in the bandwidth of the output streams. This is often not the case however where the downstream medium is a hybrid fiber coaxial cable CATV plant (hereafter HFC). In such cases, structure to carry out an additional function is necessary in the pull multiplexer. In HFC, there is a fixed maximum amount of bandwidth available, and it must be shared by all the users coupled to the cable. Thus, as the number of requested programs and/or services rise, more and more bandwidth is consumed.

When the load rises to the point that the maximum available bandwidth is about to be exceeded, the pull multiplexer must adjust the bandwidth consumption of the output streams to stay within the bandwidth constraints. Generally, this can be done by commercially available resampling chips. Typically, downward adjustment of bandwidth is done by decompressing the compressed data packets and re-compressing them with a different, stricter compression algorithm which results in less quality but lower bandwidth consumption until the desired bandwidth is reached.

In an alternative embodiment, a pull multiplexer does all of the above (including bandwidth management if necessary) but automatically includes certain high demand programs in the output stream(s) even if they have not been specifically requested. High demand programs are programs that somebody will want to view almost always. These programs are included in one or more output streams at all times in this subgenus of species. The remaining program slots in the channels not consumed by broadcast programs are devoted solely to programs that have been requested and are shared by all users.

In another subgenus of species, the pull multiplexer includes a load management process that functions to make sure as many users as possible receive their requested services and/or programs given the bandwidth constraints of the downstream. In some species, this load management process also attempts to group all requested programs and services being used at a single customer premises on a single channel if possible so a gateway or modem with only one tuner can be used to recover all the data packets of all the requested programs and/or services. In some circumstances, a certain high demand program has been requested as part of a plurality of different requested programs from the same customer premises. Suppose this high demand program is either being broadcast or has also been requested my multiple other customers and the channel on which it is being transmitted has no available program slots for the other program(s) and/or services that have been requested by the customer. In such a case rather than move the high demand program/service that is also being viewed/used by other customers to another channel with the need for downstream messages to all these other customers telling them where it has been moved and an interruption in service, another approach is possible. In such a situation, the load management process simply sends another copy of the data packets encoding the high demand program/service on another channel which has available slots for the other program(s) and/or services that the customer has also requeste. This way, all the requested programs/services can be received with just one tuner in the customer's gateway/modem thereby reducing the cost to the customer of their equipment. One or more aspects of the processing defined in this paragraph or similar processing described in the detailed description section, and the program structure(s) needed to do this processing, are referred to in the claims as a means for managing output streams for maximum efficiency.

As the terms are used herein, a channel is a slice of bandwidth on the downstream medium that is typically 6 MHz wide, and a program slot is a slice of the channel bandwidth devoted to carrying a requested program. A channel may be a separate radio frequency carrier having a center frequency at the middle of the band of frequencies that define the channel and passband filtered such that its spectrum does not extend outside the channel frequency limits. Typically, each requested program is comprised of a plurality of MPEG packets having one or more PIDs. All these packets for each requested program to be carried on a channel are included in the output stream fed to the transmitter and then modulated on the carrier for that channel. At the customer premises, the carrier is tuned and the digital data of the packets is recovered and packets not having PIDs of requested programs are filtered out. The remaining packets are sent over a LAN to the settop decoder box that requested the program and converted to video signals and other signal formats such as an accompanying audio track or on-screen data displayed with the program.

Alternatively, on fiber optic media, a channel may be a slice of bandwidth centered on a particular frequency by a passband filter that filters the spectrum of the output stream from the pull multiplexer to reject all frequency components outside the channel's frequency limits. For example, the digital data of the various programs carried on the channel may be spread spectrum multiplexed and summed and the overall spectrum filtered by the passband filter down to a 6 MHz wide spectrum centered on the channel frequency.

A novel aspect of the video-on-demand systems disclosed herein is that they can not only supply video-on-demand programming but also broadband internet access and other broadband services through T-carrier interfaces. The process of providing video-on-demand services along with push programming as well as broadband services from the head end comprises the following steps generally:

receiving one or more input streams of MPEG or other compressed video data in packets from one or more video servers;

receiving one or more input streams of internet protocol format packets from one or more WAN servers or gateways or routers coupled to a wide area network;

receiving one or more input streams of data packets from a T-carrier interface circuit;

receiving one or more requests for video-on-demand programs and/or services encoded in data provided by said one or more WAN servers or gateways or routers or said T-carrier Interface circuits, said one or more requests transmitted by said customers over an upstream logical channel on said HFC;

mapping said one or more requests to one or more program identifier codes, IP packet address information or other packet identifying information, and using said program identifier codes for requested video-on-demand programs to send messages to one or more video servers telling them which video-on-demand data files to output, and using said program identifier codes and/or IP packet address information or other packet identifying information to cull out compressed video packets of at least requested video-on-demand program(s) and/or service(s);

organizing said culled out compressed video packets into one or more output data streams, each for transmission by a different cable modem on said shared HFC, each cable modem transmitting one or more logical channels, each with a plurality of subchannels;

sending downstream messages to said customers telling them which logical channels and subchannels upon which they can find their requested video-on-demand program(s) and/or services; and receiving upstream internet protocol format and/or other format upstream data packets and routing them to the appropriate WAN server, gateway or router or said T-carrier interface circuitry.

One of the novel aspects of the systems disclosed herein is that each customer premises can have a gateway which allows signals and data from other sources besides a single broadband source such as a DSL line or a cable modem can be supplied to the peripherals coupled to the gateway by a LAN. Typical gateways have satellite transceivers, cable modems, DSL modems, an interface to the public service telephone network and tuners for conventional TV antennas. All these circuits are interfaced to one or more local area networks through an IP packetization and routing process and one or more network interface cards. Typical circuitry that couples the signal interfaces to the LAN interface are decoders to convert digital representations of signals YUV format so that an MPEG encoder can compress them down to the available bandwidth on the LAN. Similarly, incoming MPEG packets may be decompressed and then recompressed to fit the available bandwidth on the LAN. A typical process that occurs in such a gateway contains the following steps:

receiving one or more requests identifying one or more video-on-demand programs and/or services a user wishes to enjoy;

transmitting said requests to a head end cherry picker multiplexer which can supply the requested data;

receiving one or more downstream messages indicating from which logical channels and subchannels the data of the requested program(s) and/or services may be recovered from a downstream medium;

tuning to the specified logical channel and demultiplexing the specified subchannels and recovering the requested data as compressed video or other data packets;

if the requested program is an analog video broadcast on the airwaves or a cable TV hybrid fiber coaxial cable network, tuning to the requested signal, digitizing and demodulating the tuned signal to generate a baseband digital NTSC, PAL or SECAM video signal;

if necessary to meet bandwidth constraints decompressing recovered compressed video and other data packets and recompressing them to a lower bandwidth that can be transmitted on the available bandwidth of said local area network;

converting digitized representations of NTSC, PAL or SECAM video signals to YUV format if said local area network has inadequate bandwidth to carry uncompressed video signals along with other network traffic then existing;

compressing YUV format data to MPEG packets having a state of compression that fits the available bandwidth;

packetizing compressed video and other data into internet protocol packets (hereafter IP packets) and encapsulating the IP packets in LAN packets addressed to the one or more peripherals that requested one or more program(s) and/or services and transmitting said LAN packets over said local area network to the peripherals that requested the data;

receiving upstream LAN packets and recovering encapsulated upstream IP packets therein; and routing said upstream IP packets to either a cable modem, a DSL modem, a satellite dish transceiver or a conventional modem for coupling to a public service telephone network for transmission on an upstream logical channel.

The organization and operation of the customer gateways also provides a unique ability to perform video conferencing without a video phone using only a TV and a video camera coupled to a settop box. The elements of such a video conferencing apparatus are:

a gateway having interface transceiver circuitry for either or both a digital subscriber line or hybrid fiber coaxial cable of a cable TV system, and having a router and network interface circuit and having means coupling said interface transceiver circuitry to said router and network interface circuitry for compressing at least video and audio video teleconference data received from said digital subscriber line or said hybrid fiber coaxial cable and packetizing said compressed data and sending said packets to said router;

a local area network coupled to said network interface circuit for carrying downstream packets of video teleconferencing data;

a settop decoder coupled to said local area network for receiving said downstream packets of compressed video and audio data and converting them into conventional NTSC, PAL or SECAM format video signals;

a conventional television coupled to receive and display said conventional NTSC, PAL or SECAM video signals;

a conventional video camera or videophone coupled to said settop decoder for outputting upstream conventional NTSC, PAL or SECAM format video signals for the upstream portion of a video teleconference;

and wherein said settop decoder includes circuitry to receive said conventional format upstream video signal, digitize said video signal, compress the resulting data and packetize the resulting compressed into upstream video conference packets addressed to said network interface and router of said gateway for transmission over said local area network;

and wherein said router routes said upstream video teleconferencing packets to the appropriate interface transceiver circuitry for either said digital subscriber line or said hybrid fiber coaxial cable, depending upon which medium is being used to deliver the upstream teleconference data.

In general, the functions performed in the pull multiplexers and cable modems and gateways and DSL modems can be performed by any conventional circuitry that is already known. Nothing about the structure or operation of the devices described herein is critical to the invention unless specifically so stated or it is essential to achieve the result described even if not specifically stated to be critical to the invention.

BRIEF DESCRIPTION OF THE DRAWINGS

FIG. 6 is a block diagram of a preferred form of DSL head end cherry picker multiplexer.

DETAILED DESCRIPTION OF THE PREFERRED AND ALTERNATIVE EMBODIMENTS

Figure 1:
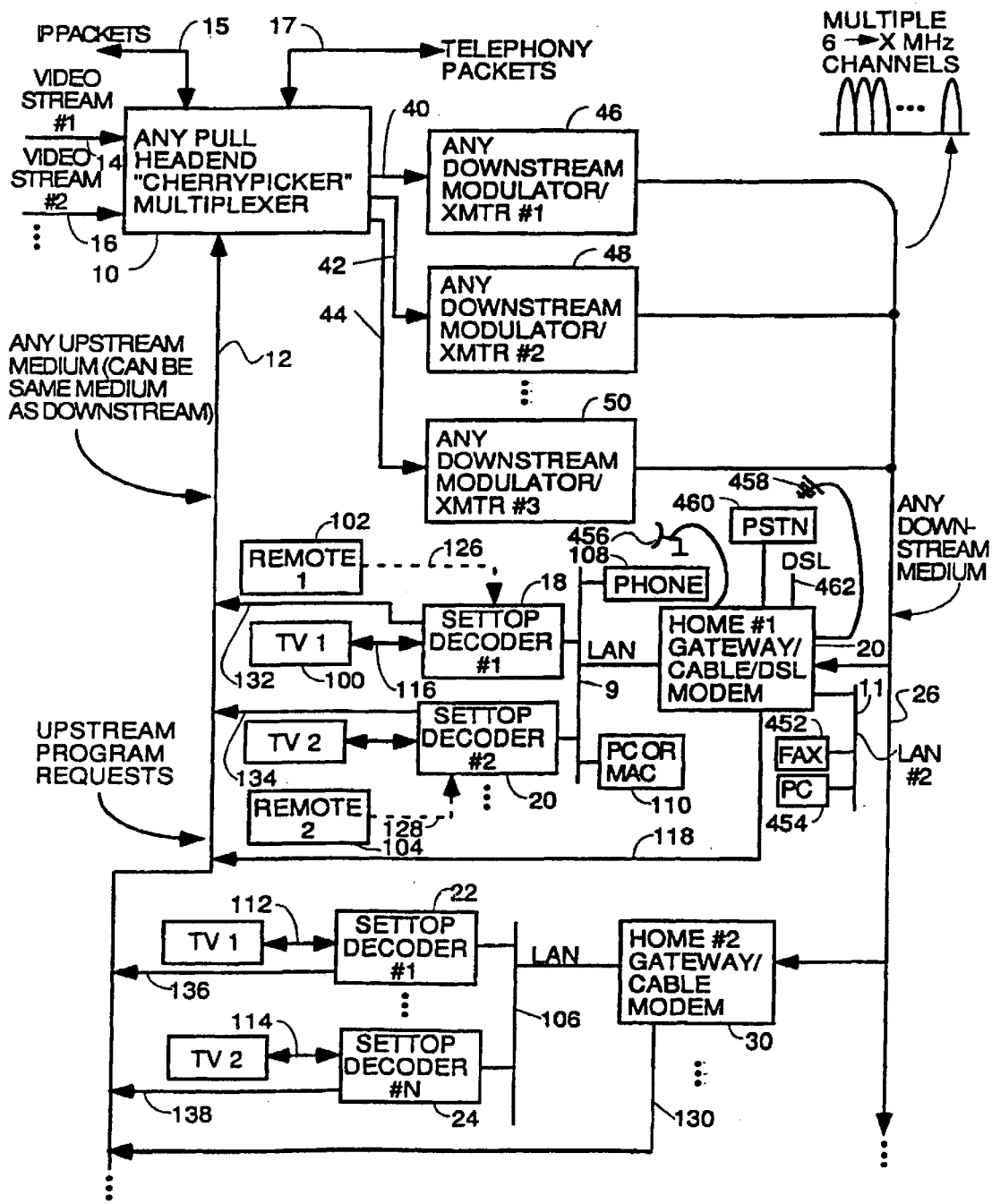
FIG. 1 is a block diagram of one embodiment of a system employing the teachings of the invention.

Generally, speaking, the genus of the invention includes all species of system architectures and methods of operation that have the following characteristics. They will include a head end multiplexer that receives upstream program and/or service requests and picks out data from input streams that satisfies those program/service requests. These head end multiplexers will output data streams for downstream transmission that satisfy those requests, and, if necessary adjust the bandwidth of the output data streams to fit the available bandwidth. The head end multiplexer will also send downstream messages to the modems or gateways at each customer premises indicating on which channels they can find their requested programs.

In some species within this genus, the head end multiplexer culls out data packets of popular programs that are frequently watched such as CNN or ESPN and mixes that data in with data packets of requested programs on the output stream regardless of whether there has been any specific request for the high demand programs/services.

In other species within the genus, the head end multiplexer also does load management to maximize the efficiency with which requested programs are received and the available channels and program slots are used. For example, if it is known that three requests for three different services or programs have been received from a customer that has only one tuner, the management process will instruct the culling or cherrypicker switches to pick out the packets for these programs and/or services and put them all on the same channel where possible. If necessary, if one of the programs/services is already being transmitted on another channel and there is no room left on that channel for the remaining programs/services requested by a particular customer, then copies of the packets encoding the program/service already being transmitted will be transmitted on another channel that has room for the remaining programs/services requested by the customer.

In other species within the genus, the head end multiplexer also does bandwidth management in environments where available bandwidth is limited and shared between all users. Such environments include typical cable TV plants today. The head end multiplexer multiplexer, also known as a "cherry picker", manages the bandwidth of the output stream such that all requested programs are present in the output stream (assuming sufficient bandwidth is available), but their bandwidth is decreased it necessary so as to not exceed the available bandwidth on the downstream medium. In such species, the head end multiplexer will include circuitry to cull out all the requested program packets from the input streams, assemble the culled packets into an output stream and adjust the bandwidth of the output stream so as to not exceed the available bandwidth of the downstream medium. This is usually done by decompressing the data in the packets culled out from the input stream back to its uncompressed form and recompressing it with an algorithm that results in more compression so as to reduce the amount of bandwidth consumed by the output stream(s) so as to be within the bandwidth constraints of the downstream medium. Usually, the input streams are MPEG compressed video streams, but the invention is not limited to video program input or MPEG compression. The input stream may be any form of data, even uncompressed data, including IP packets or packets re-assembled from T1 timeslots or other high bandwidth telephony services. If uncompressed data is received, the cherry picker compresses it down to the available bandwidth on the downstream.

Figure 4:
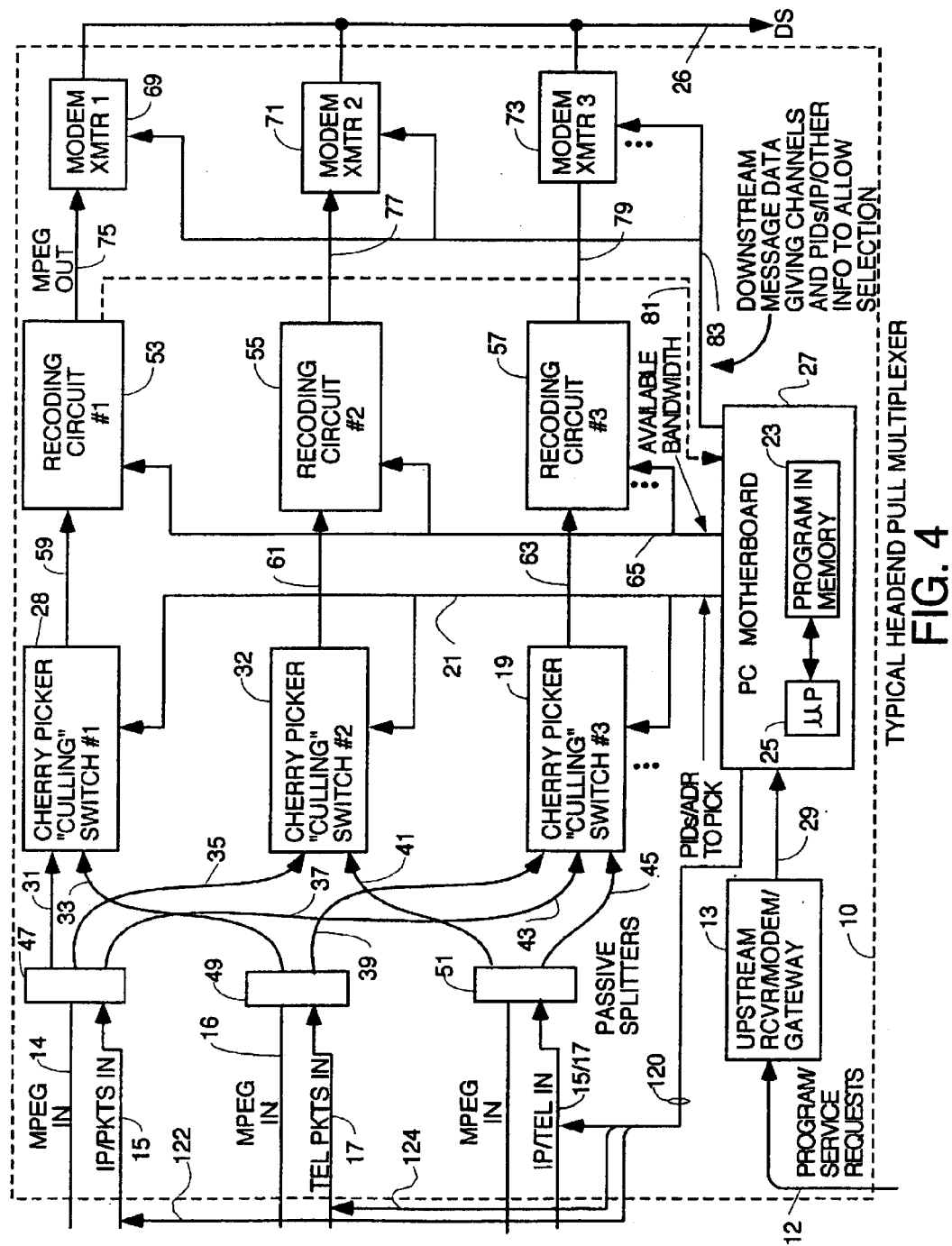
FIG. 4 is a block diagram of a prior art cherrypicker that has been modified to receive upstream program and/or service requests and upstream data and to use the program and service requests to cull out data for requested programs and services after routing the requests to video and other servers that can supply the requested data and which can route upstream data generated by customers to the proper servers.

Referring to FIG. 1, there is shown a block diagram of a system according to the teachings of the invention. A head end multiplexer or cherry picker 10 receives one or more input data streams of any type data. FIG. 4 shows a typical head end cherrypicker structure. Referring jointly to FIGS. 1 and 4, there are shown are several video input streams 14, 16 from local video and/or multimedia servers, a downlink dish etc. The structure and operation of the video and multimedia servers may be any known design including the design taught in U.S. Pat. No. 5,802,283 for a multimedia server for an ADSL network, which is hereby incorporated by reference. The input streams can also include an IP packet stream 15 from a modem, router, gateway or server (not shown) coupled to the internet or from a local server coupled to the internet. The input data streams to the cherry picker 10 can also include a stream 17 of telephony packets from, for example, circuitry coupled to any of the following type of digital data delivery networks over the public switched telephone network: N-carrier, L-carrier, T-carrier, channelized T-carrier (T1, E1, J1), DSL, ADSL, HDSL, X.25 packet switched networks, Common Channel Signaling and Control (CCS networks), Dataphone Digital Service, Switched 56 Kbps (also known as DSA) nets, ISDN, frame relay, or cell switched (SMDS or ATM) network.

The cherry picker 10 also has an input coupled to any upstream medium 12 for receiving upstream program and/or service requests from the users in the customer premises. This input is coupled to the receiver section 13 of a modem coupled to the downstream in cases where the downstream and upstream are transmitted on the same media or to a separate gateway, receiver or modem where the upstream 12 is a separate medium such as a telephone line etc.

The upstream requests identify the requested program and/or services various users coupled to the system desired to view and/or use. The gateway 13 controls the upstream session via a log-in procedure, authenticates the requester and her privileges, and validates the requested services and/or programs based upon the status as an authorized subscriber and whether or not the request is within the privileges of that subscriber. Valid requests from authorized users are passed on to a PC motherboard 27 of cherry picker 10. In some embodiments, the gateway 13 may also send data downstream to present a menu to users of video programs, multimedia files, telephony services or wideband internet access or other wideband services which are available for selection by the user. When a valid upstream request for a program and/or service is received by the gateway 13, it transmits a message to the appropriate server requesting that a video program and/or service(s) identified in the message be transmitted to the cherrypicker 10 via the appropriate one of the links 14, 15, 16 and/or 17. The requests are also passed to the PC motherboard 27 of the cherrypicker in FIG. 4.

The cherry picker 10 converts these requests for programs and services to program identifier codes (PIDs), IP sources addresses or other identifying codes that can be used to cull out the data packets in the input streams that encode the requested programs and/or services supplied by the video/multimedia server, the T1 interface circuitry, the internet server and/or any dish interface circuitry or other interface to a source of data to which the request was passed.

The upstream medium 12 can be any medium that can get the program and/or service requests to the cherry picker. It can be a telephone link, a satellite uplink, a microwave or radio link or it can be an upstream management and control channel that is time division, frequency division or code division multiplexed or otherwise kept separate from the downstream channels on a downstream medium 26 such as hybrid fiber coax (HFC). The cherry picker must have suitable known internal or external circuitry such as a modem, receiver etc. that can interface to the upstream medium and recover the program/service requests therefrom. In CATV systems, the cherry picker 10 can have built into it or separate, a cable modem with a receiver section 13 that recovers the upstream program/service requests. Numerous suitable cable modems are commercially available including the Terayon TeraPro and DOCSIS modems as well as those of other manufacturers. Suitable cable modems are described in U.S. Pat. Nos. 5,768,269 and 5,793,759 which are hereby incorporated by reference.

The cherry picker 10 also includes cherrypicker switch circuitry such as are shown at 28, 32 and 19 for generation of three output streams. There are as many switch circuits as there are output streams or channels to be transmitted. Each channel carries multiple programs/services, typically from four to twelve. The switch circuits 28, 32 and 19 receive upstream program/service requests on bus 21 from a management process program 23 in execution on a microprocessor 25 on a motherboard 27. The motherboard has an input 29 coupled to the data output of the upstream receiver/modem 13 to receive the upstream program/service requests extracted by the receiver 13 from the upstream data on medium 12. The cherry picker switches, in the embodiment shown, also include inputs 31 through 45 for receiving raw data streams from the inputs. These inputs 31 through 45 are coupled to the raw data inputs 14, 15, 16 and 17 through a plurality of passive splitters 47, 49 and 51. These splitters just take each input stream and couple the data onto a plurality of output streams that are coupled to the input of the cherrypicker switches.

Each cherrypicker switch 28, 32 and 19 functions to use the program identifier codes, IP source addresses or other identifying information on bus 21 generated from the upstream program/service requests to cull out the data packets from the input streams 31 through 45 that encode the requested programs/services. Typically, this culling process is done by switching circuits that receive the PIDs or other identifying information from a management process 23 running on a PC motherboard 27 or other computer coupled to the upstream receiver. Each input stream is comprised of MPEG or other packets that have headers. MPEG packets that encode video, audio and associated data of programs that can be watched on a TV contain program identifier codes. These PIDs map to the more informative long name such as CNN, Starz, ESPN, etc. Likewise, IP packets, called datagrams, have headers which include information that can be used to cull out only the IP packets desired from, for example, streaming media IP packet streams. IP datagram headers include fields such as: the source IP address, an identification field that allows the destination host to determine which datagram an newly arrived fragment belongs to (all fragments of a datagram include the same ID), a fragment offset that tells where in the overall datagram each fragment belongs, and an options field that can be used for source routing information, service identification, security or anything else not thought of in the original standard. These header fields are used to determine which IP datagrams or fragments to cull out of the input stream. Likewise, telephony packets assembled from fragments delivered in T1 timeslots etc. can be culled out of the input stream based upon program and/or service identifying information in the packet header. The PIDs and other identifying information in each header are examined by the cherrypicker switches and compared to the list of PIDs or other identifying information identifying the requested program(s) and/or services and/or the programs/services to be pulled regardless of requests.

The culled packets selected by the recoder circuits have the headers stripped and the payload data in the packets is then decompressed and recompressed if necessary to reduce the bandwidth. This process is done by the recoding circuits 53, 55 and 57. These circuits receive the compressed or uncompressed data packets (or a combination of the two) on input lines 59, 61, 63 etc. and available bandwidth information from the management process 23 on bus 65 from the motherboard 27. Separate buses are shown coupling the motherboard to multiple circuits, but in reality, all these buses may be simply the motherboard-host bus and the data described herein just sent to each circuit when that circuit is addressed by the address lines on the bus. The available bandwidth information on bus 65 tells the recoding circuits how much additional compression to perform or that sufficient bandwidth is available on the downstream to meet the current bandwidth consumption in some embodiments. In the preferred embodiment, the available bandwidth information on bus 65 just tells the recoder circuits how much bandwidth is available on the downstream. In such embodiments, the recoder circuits decide for themselves how much bandwidth is consumed by the input streams and how much compression to perform to meet the bandwidth restrictions apparent from the information on bus 65. The recoding circuits are known and commercially available from Terayon Communications Systems, Inc. in Santa Clara, Calif. They were orginally designed by Imedia Corporation and are described in U.S. Pat. Nos. 5,956,088 and 5,877,812 and 5,862,140 all of which are hereby incorporated by reference.

The recoder circuits output their compressed data to either the downstream transmitters 69, 71, 73 or to the motherboard 27 depending upon whether the recoder circuits include circuitry to repacketize the compressed data. In embodiments where the recoder circuits include circuitry to repacketize the compressed data into MPEG or IP or other packets for the downstream, the repacketized data for each of three channels is output on buses 75, 77 and 79, respectively to the three transmitters 69, 71 and 73 for these three channels.

Message data to the transmitters telling each transmitter which data packets to transmit on which subchannels can be sent in-band in packets marked with an administrative code in the headers or out of band on a subchannel or by a physically separate data path (not shown). This is true for all of the embodiments shown in FIGS. 1, 2 and 3.

In some embodiments, the recompressed data is output on a bus 81 to the motherboard for repacketization there. These embodiments are symbolized by bus 81 in dashed lines. In these embodiments, the repacketized data is transmitted via bus 83 to the transmitters 69, 71 and 73 for downstream transmission as appropriate.

Each downstream transmitter modulates the output data onto a different frequency carrier for coupling to the downstream medium in the preferred embodiment. The transmitters multiplex the data of the different channels into different logical channels on the downstream by any known form of multiplexing. The downstream multiplexing can be FDMA, TDMA, SCDMA, CDMA, STDMA, DMT or, in the case of fiber optic media transmissions at baseband, simply a digital burst of packets transmitted in assigned minislots for each transmitter and with programs and services separated at the destination host by the PIDs or other identifying information in the packet headers).

In alternative embodiments where bandwidth alteration is not necessary such as fiber-to-the curb environments, the switching circuits 15, 17, 19 etc. simply cull out the data packets of the requested program and/or services and send them to the downstream transmitters for driving onto the fiber without bandwidth alteration. In some embodiments, the video streams output by the cherrypicker switches are sent to the PC motherboard 27 for changing of PIDs or addition of other information to packet headers.

The PC motherboard is programmed to repacketize the culled, recoded data from the recoder circuits 53, 55 and 57 into downstream packets and assemble the packets into one or more output streams on bus 83 (only in embodiments where recoding and repacketization is necessary). In all embodiments, the PC motherboard (it could be a Macintosh motherboard or Unix motherboard also) also, optionally, performs a load management process to get all requested programs from any particular customer onto the number of channels that customer's equipment is capable of tuning. This process is done by outputting the PIDs or other information by which to do the culling process on bus 21 such that the cherrypicker switches are controlled to put all the PID data from requested programs from one customer onto the number of channels that customer is capable of simultaneously tuning. If the customer's modem or gateway can only tune one channel at a time, all the PIDs for the requested programs/services are sent to one cherrypicker switch so they will all appear on one downstream channel. The load management process then generates a downstream message addressed to that customer telling the customer upon which channel the requested programs/services will appear. If the customer can tune three simultaneous channels, the requested programs and/or services can be put on three different channels if necessary, and the appropriate downstream messages are generated by the motherboard and sent downstream. The downstream messages are sent from the motherboard 27 to the downstream transmitters via bus 83.

Each output line Is coupled to a separate transmitter/modulator in some embodiments symbolized by FIG. 1 by transmitters/modulators 46, 48 and 50. Each transmitter or modulator modulates the data of its output stream into a downstream channel that is typically 6 Mhz wide. Conventional transmitter/modulator circuits suitable for the downstream medium in use can be used. In CATV HFC environments where both the upstream and downstream are modulated onto the HFC, all the transmitters/modulators can be a single SCDMA cable modem such as are commercially available from Terayon under the TerraPro trademark and described in U.S. Pat. Nos. 5,768,269 and 5,793,759. These modems can accepts TDMA input streams having multiple logical channels each one of which is one of the output streams from the cherry picker 10 and modulate each output stream onto a separate logical channel or program slot of a single 6 Mhz QAM modulated RF carrier.

Each customer premises has a gateway and/or cable modem coupled to the downstream medium such as are illustrated at 28 and 30. The function of these gateways and cable modems is to receive the digital data of the requested programs/services and route it over a local area network in the customer premises to the settop decoder or other peripheral that requested the program/service. An exemplary gateway that can serve the functions of gateways 28 and 30 is taught in U.S. patent application entitled HOME NETWORK FOR ORDERING AND DELIVERY OF VIDEO ON DEMAND, TELEPHONE AND OTHER DIGITAL SERVICES having Ser. No. 09/483,681, filed Jan. 14, 2000, which is hereby incorporated by reference. Incoming packets for a video program that have been requested via settop decoder 18 are encapsulated into an Ethernet or other LAN packet (depending upon the LAN 9 in use and sometimes hereafter referred to as simply Ethernet packets for brevity) and routed to the appropriate settop decoder that requested the program such as settop decoder (sometimes the IP packet header information is stripped and in other embodiments it is not but the PIDs or other program information is not stripped). If multiple requests have been made from different settop decoders in the same household, the LAN packets for the different programs requested are addressed to the settop decoders that requested each particular program.

At the settop decoder, the payload data on all the program slots dedicated to this video program such as the audio and video data is decompressed back to its original resolution and converted to a signal format on line 116 suitable for television 100. If TV 100 is an NTSC, PAL or SECAM TV, the appropriate analog signal format such as an NTSC signal modulated onto RF channel 3 or 4 is generated. If the settop decoder is coupled to the video or S-video and audio inputs of the TV that bypass the tuner, the video and audio data is converted into analog composite video and audio signals on line 116. In some embodiments, each TV will have an Intelligent remote control such as is shown at 102 and 104. Each of these remotes has a bidirectional radio frequency or infrared link to the settop decoder, and each of these remotes has a miniature display thereon upon which digital data associated with a program may be displayed either with or without simultaneous display on the data shown on the TV. For example, if a user is watching Goldeneye on TV 100 suppose there is associated digital data with this video program for home shopping when 007's car is in the scene such "BMW Z3 Roadster available locally from Acme BMW, phone number (408) 555-1212". This message can be displayed on the minidisplay on the remote only or both on the minidisplay on the remote and on the TV also.

The customer premises gateway or cable or ADSL modem in each customer premises is also coupled to other peripherals in the household such as computers or telephones or FAXes or digital VCRs or network computing devices (no local hard drive) via one or more local area networks. For example LAN 9 in customer #1's house couples gateway 28 to a digital phone 108 and a PC or Mac personal computer 110. A second LAN 11 couples gateway 28 to FAX 452 and another personal computer 454. The second LAN 11 may have a different medium type, use a different protocol or be of higher bandwidth than the first LAN as long as the gateway 28 has the appropriate network interface circuitry to interface to said second LAN.

Each gateway at a customer premises also may have inputs for and appropriate interface circuitry to receive broadcast data and other digital services such as DirectPC data from a satellite dish 456, a terrestial broadcast TV antenna 458, the public service telephone service network 460 or a DSL line 462. The gateway 28 includes circuitry to interface to each one of these signal sources, recover digital data from the source or digitize incoming analog signals, compress the data if necessary because of bandwidth availability conditions on the local area networks, encapsulate the data into IP packets and then into LAN packets and route the packets to the peripheral that requested the program/service. Upstream data from the peripherals will be received by the gateway from the LANs, the Ethernet packet headers will be stripped off and the IP packets routed to the appropriate interface circuitry interfacing the gateway to the appropriate upstream data path (which will depend upon the downstream medium upon which the downstream data arrived). For example, if DirectPC IP packets are received from the satellite dish, any upstream IP data packets will be routed to a conventional modem circuit in gateway 28 coupled to PSTN 460. Likewise, if downstream IP packets were received from the DSL line, upstream packets will be routed to a DSL modem in gateway 28 coupled to the DSL line for upstream transmission on the upstream DSL channel. If downstream IP packets are received from downstream medium 26 and it is hybrid fiber coax (HFC), upstream packets will be routed to a cable modem in gateway 28 which has an output coupled to the HFC for transmission on the upstream logical channel.

Typically, wideband internet access IP packets will be encapsulated into Ethernet packets by gateway or cable/DSL modem 28 and addressed to the PC 110 or PC 452. The network interface card (not shown) of PC 110 or PC 452 receives the Ethernet packets and strips off the Ethernet headers and passes the IP packets up through the IP protocol stack to the application that requested them. If the application has IP packets to send back out to the internet through the headend, the packets are generated in the application and sent down to the network interface card. The NIC encapsulates them into Ethernet packets and transmits them to gateway or cable/DSL modem 28. The gateway/modem 28 then takes these packets and transmits them to the headend via data path 118 and whatever upstream data path 12 is being used using whatever form of multiplexing and modulation is being used. For example, if gateway/modem 28 is a cable modem and the upstream data path 12 is hybrid fiber coax, then the IP packets are disassembled and interleaved, Trellis encoded, code division multiplexed onto whatever logical channels are assigned to cable modem 28 and QAM modulated onto the RF carrier being used to frequency division multiplex the upstream data from the downstream data. At the headend cherrypicker, a cable modem receives the upstream signals from cable modem 28 and recovers the IP packets in conventional manner and routs the IP packets out to the internet over data path 15 to a server or router at the headend coupled to the internet. The server is a file management system which functions to receive input video and/or multimedia or other files from providers, store these files with descriptor information about them, keep track of sessions, serve the data files out on links to the cherrypicker, and handle requests for files from the cherrypicker motherboard.

Telephony works the same way. Incoming data from one or more logical channels on a T1 line for example enter the headend via link 17. Link 17 is typically coupled to known T1 interface circuitry that is responsible for gathering bytes from T1 timeslots assigned to a particular conversation and packetizing them into IP packets addressed to, for example, telephone 108. These IP packets are culled out of the stream of packets on line 17 by cherrypicker 10 and output in the output stream devoted to the channel and program slot to which telephone 10B has been assigned for a particular session. The IP packets are then transmitted downstream to gateway 28 by whatever transmitter and downstream media 26 is in use. At gateway 28, the IP packets addressed to telephone 108 are recovered and encapsulated into Ethernet or other LAN packets addressed to telephone 108. At the telephone, the Ethernet packets are received and the encapsulated IP packets are recovered and the payload data is converted to analog signals for use by the telephone. Analog signals generated by telephone for transmission out on the T1 line are then digitized and encapsulated into IP packets addressed to the T1 line interface circuitry (not shown) coupled to the cherrypicker 10. Obviously, the telephone 108 may a video conferencing or other high bandwidth device needing T1 bandwidth. The outgoing digital data from the telephone 108 or video phone or video teleconferencing apparatus also represented by 108 is then encapsulated into IP packets addressed to the T1 line interface circuitry coupled to the cherrypicker 10 at the headend. These IP packets are then encapsulated into Ethernet or other LAN packets addressed to the gateway/modem 28 and transmitted over the LAN to gateway/modem 28 where they are received and the IP packets recovered. The IP packets are then transmitted upstream to the cherrypicker 10 via data path 118 using whatever form of multiplexing and modulation that is conventional for the upstream path 12. If the upstream data path 12 is shared by all the customer premises for both upstream and downstream data transmission, then some form of upstream multiplexing such as SCDMA, CDMA, FDMA or TDMA is used to separate the upstream data from the various customers. In addition, the upstream data must be multplexed to keep it separate from the downstream data. Typically FDMA is used for that purpose but other forms of multiplexing could also be used. If the downstream and upstream data paths 26 and 12, respectively, are DSL lines, there is no need for multiplexing to separate the data from different customers since each customer gets her own DSL line, and conventional DSL multiplexing to separate upstream from downstream data is used.

At the headend, the upstream IP packets for telephony and wideband internet access are recovered by conventional upstream receiver/modem/gateway 13. The IP packets are then transferred to the PC motherboard 27 where a routing process examines the IP destination addresses and routs each packet onto the appropriate one of the lines represented by bus 120. This bus contains individual lines coupled to the T1 interface circuitry via data path 17 and to the server, router or gateway circuitry (not shown) coupled to the Internet and coupled to the cherrypicker 10 via data path 15 in some embodiments, and, in other embodiments, is a packet data network sharing a single transmission medium to which both the T1 interface circuitry (not shown) and the internet server, gateway or router (not shown) are connected by network interface cards. IP packets to be sent out over the internet are routed by PC motherboard 27 onto line 122 and IP packets to be transmitted on the T1 line are routed onto line 124. These lines 122, 124 symbolize either separate physical data paths to the wide area network server(s) and telephone company digital switches or separate upstream logical channels transmitted to these servers on the same medium upon which downstream IP packets and telephony packets were transmitted to the cherry picker 10.

At customer premises #2, LAN 106 connects a gateway 30 to two different settop decoders 22 and 24 each of which converts the video and audio packets of requested programs into video and audio analog signals on lines 112 and 114, respectively.

Either the remotes 102 or 104 or the settop decoders 18, 20, 22 or 24 can be used to enter video-on-demand program requests. If the remotes are used to enter program requests, the identifying information is transmitted by an RF or infrared link to the settop decoder associated with the remote. These RF and IR links are symbolized by dashed lines 126 and 128 in FIG. 1. Service requests are generated by one or more telephones and/or personal computers and/or other peripherals at each customer premises. Each service request is encapsulated into an Ethernet (or other LAN) packet which may be addressed to the gateway/modem 28, 30 etc. or, in alternative embodiments, to the settop decoder circuits 18, 20, 22 or 24. These program and service requests are transmitted from the gateway/modem or settop decoder to the headend cherry picker via data paths 118 or 130 or 132 or 134 or 136 or 138, as appropriate. At the headend cherrypicker upstream receiver/modem 13 in FIG. 4 recovers the program and service requests and passes them on to the PC motherboard 27. There they are processed and the PIDs and source addresses in IP packets to be culled out and put into the various output streams on lines 75, 77 and 79 are derived and relayed to the culling switches 15, 17, 19 etc. The video program and service requests can be sent as long program names and then converted at the headend PC motherboard into PIDs and/or IP source addresses or other identifying information by a table lookup process. The PIDs and/or IP source addresses or other identifying information to be used by the culling switches to pull out the desired programs and services are sent to those switches via bus 21.

A system architecture according to the genus of the invention will have the following characteristics which are illustrated in FIG. 1.

First, a head end multiplexer 10 receives upstream requests for desired programs via any path 12. The upstream path can be a satellite uplink, a wide area network, the internet, an FDMA, CDMA or TDMA upstream channel on the same medium used to transmit the downstream data or the public telephone network.

Second, the cherry picker 10 must receive one or more input data streams 14 and 16 of raw data of various programs from which the requested programs are culled. The input data streams are typically video streams of MPEG compressed video, audio and other associated data defining a plurality of programs. The architecture of the invention is not limited to video program data, nor is it limited to MPEG compressed data. In some embodiments, the input data streams on lines 14, 16 etc. can be IP packets, telephony packets, video packets with associated audio and data compressed with MPEG or any other compression scheme, MP3 data, or any other types of data packets or streams known now or invented in the future or some combination of the above. All that is necessary is that the incoming data packets or stream have PIDs or IP addresses or some field of information that identifies the service or program the data encodes so that the cherry picker 10 can cull out requested services or programs or services or programs with high demand that are supplied on a constant or regularly scheduled basis on one or more channels on the downstream medium 26. This raw input data is supplied from one or more local or remote video servers, satellite downlinks, internet service providers, T1 or other high bandwidth lines, or other sources on one or more inputs to the cherry picker 10.

Third, there must be circuitry somewhere to map whatever code, channel number or name that is used by the user to designate the desired program or service to one or more program identifier code(s), hereafter PID(s), IP source addresses or any other identifier of the program or service the data encodes. In the case of PIDs, the PIDs mapped to the requested program(s) will be in the MPEG packets of the video, audio and any associated data packets of the desired program(s) in the input video streams on lines 14, 16 etc. In the case of other types of services such as high speed internet access, telephony over CATV cable plants, or fiber-to-the-curb plants, etc. This mapping function can be done at the cherry picker 10 or, alternatively, it can be done at the settop decoder boxes such as are shown at 18, 20, 22 and 24 such that the upstream program requests are already in the form of the PID(s) that identify all the components of the desired program. These PIDs will be in the MPEG packets of the video, audio and any associated data packets of the desired program(s) in the input video streams on lines 14, 16 etc. These PIDs are what the cherry picker 10 uses to cull out all the MPEG data packets of the requested programs from the input streams 14, 16 etc. In embodiments where the video, telephony, wideband internet access and other servers do not provide all video programs and services available to the input of the culling switches at all times, there must also be circuitry such as a gateway to route valid requests for video programs and/or services to the appropriate servers to cause them to transmit the data of the video program or service to the culling switches.

Fourth, there must be circuitry in the cherry picker(s) 10 that uses the PID(s), IP addresses or other service and/or program identifiers identified by the mapping process to cull out the data from the input streams that encode the program(s) and/or service(s) requested by the user(s). The culled out data packets from the raw data input streams are then assembled into output data streams, each stream to be transmitted on one channel and each stream encoding one or more programs or services up the maximum capacity of the channel.

Fifth, there must be some downstream medium and an upstream medium, but these mediums can be shared with the upstream and downstream traffic multiplexed to keep it separate. The medium type is unimportant and can include hybrid fiber coaxial cable plants of CATV systems, the airwaves, DSL lines, microwave links, wireless or other cellular systems and satellite downlinks and satellite uplinks or telephone lines for the upstream.

Sixth, bandwidth adjustment must be performed if the amount of data requested and "pushed" can exceed the available for the requested and "pushed" data on the downstream medium in use. Data that is "pushed" is data of programs and services not specifically requested which ordinarily has a high demand level and is broadcast without request because of the high probability that someone will have a request for it active). The use of pushed data for high popularity programs and services helps save bandwidth because multiple customers may be watching the same program and only the number of subchannels needed to carry the components of the pushed program or service are consumed regardless of how many customers are tuned in. Thus, for example, "Who Wants To Be A Millionaire" can be pushed on two subchannels for its audio and video components even though 1000 customers are simultaneously watching it.

Figure 2:
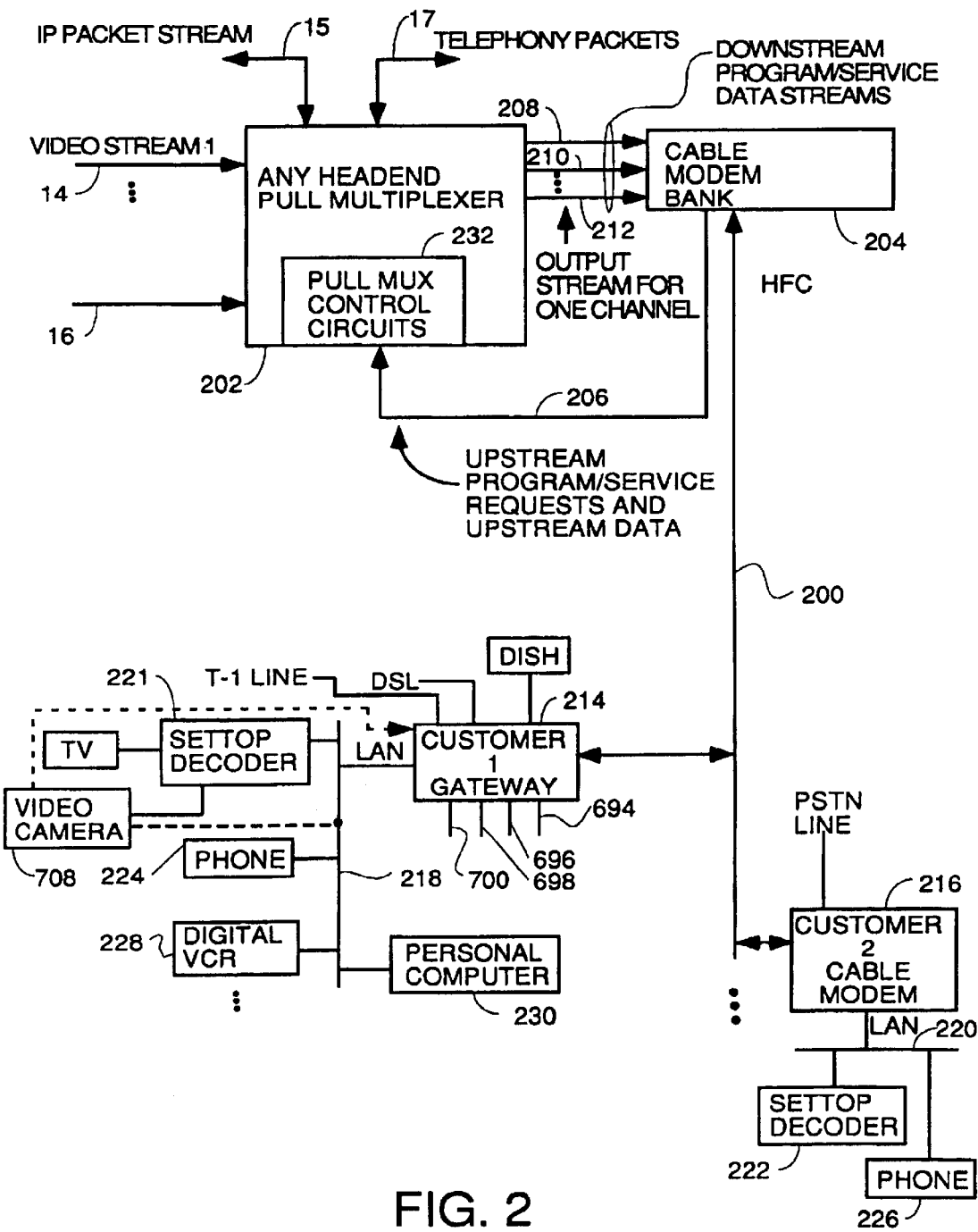
FIG. 2 is a block diagram of an alternative embodiment of a system within the genus of the invention having a pull multiplexer at the headend and a gateway at every subscriber which can receive requested video programs and/or services via a downstream HFC medium or from DSL or satellite dish inputs coupled directly to the gateway.

Referring to FIG. 2, there is shown a block diagram for a species of system employing the teachings of the invention and which uses Hybrid Fiber Coaxial cable 200 of a CATV system for both the upstream and downstream mediums. In this sytem, the headend pull multiplexer 202 is structured and operates in approximately the same way as the pull multiplexer 10 in FIG. 1 except that the upstream program and service requests and upstream data packets are recovered by the cable modems in cable modem bank 204 and are transmitted to the pull multiplexer via line 206 as upstream messages and/or IP packets and are simply routed to the correct place. If the upstream data is requests for programs and/or services, the computer (not shown) in pull multiplexer 202 maps the names of the programs and/or services to PIDs, IP source addresses or other data for use in culling out the requested data from the incoming streams of data on lines 14, 15, 16 and 17. In cases where the video-on-demand and other servers do not output the data of all possible services and programs that can be requested simultaneously, the pull multiplexer 202 also functions to route the PIDs and other identifying information specific to the programs and services requested to the video-on-demand server and other servers as appropriate to cause them to output the requested data.

The culled data is packetized into MPEG or other compression format packets after having been bandwidth adjusted if necessary and grouped into one or more output streams 208, 210 and 212, each output stream having packets for multiple programs and/or services therein. Each output stream is supplied as a data input to one cable modem in a bank of cable modems 204. Each cable modem multiplexes the data from the different programs and services in the input stream into different logical channels by any known form of multiplexing such as frequency division, code division or synchronous code division, time division or synchronous time division, discrete multitone etc. The different logical channels are each then modulated onto one or more carriers that are frequency division multiplexed from each other and from the upstream data by any known form of modulation such as by quadrature amplitude modulation, QPSK etc.

Downstream message from the pull multiplexer to the subscribers indicating which carrier and logical channel on that carrier carry the requested programs and/or services are also transmitted downstream either as broadcasts or as point-to-point transmissions individually addressed to the subscribers that made the requests. The downstream messages are typically transmitted on one or more logical channels dedicated to management and control traffic or they may be transmitted on a subchannel or by any other out-of-band or in-band scheme known in networks for transmitting management and control data. If the downstream messages are broadcast, the individual gateways at each customer premises compares the PIDs and/or other identifying information in the broadcasts with the PIDs and/or other identifying information of the programs and services that were requested to find the carrier and logical channel on which the requested data will be arriving.

The structure and operation of the gateways and cable modems at the customer premises such as gateway 214 and cable modem 216 are similar to the gateways and cable modems previously described in FIG. 1. Incoming MPEG and IP packets for requested programs and services is recovered from the carriers and logical channels indicated in the downstream messages. The Ethernet addresses of the peripherals that requested each program and service is then looked up based upon the PID and/or IP source address or other identifying information in each incoming MPEG and/or IP or other format packet. When the peripherals generate their program and/or service requests, they are encapsulated into Ethernet packets and transmitted to the gateway or cable modem. Each request is recorded in a table that contains entries to identify the program/service requested and the Ethernet address of the requesting peripheral. Incoming packets from the headend usually only have PIDs and/or IP source and destination addresses but they may also have other identifying information. In some embodiments, the gateway 214 and cable modem 216 maintain a mapping table at least between the PIDs and IP addresses or other identifying information of all programs and/or services requested and the information such as the long name or menu number identifying that program or service received from the peripheral. This table can be stored in nonvolatile memory such as ROM if the mappings do not change or may be built in RAM at powerup time by a request to the headend to download the current mapping table. Basically, any known way of figuring out to which peripheral the data packets for each requested program and/or service are supposed to be addressed will suffice for purposes of practicing the invention will suffice.

After determining which peripheral requested the recovered MPEG and IP packets and other packets encoding the requested program(s) and/or service(s), the recovered packets are encapsulated into Ethernet or other LAN packets. These LAN packets are addressed to the peripheral that requested them and driven onto the LANs 218 and 220. Note that in the embodiments of FIGS. 1, 2 and 3, the gateways may be coupled to the peripherals by individual dedicated coaxial cables, twisted pairs, Cat 5 wires, phone lines or power lines or a wireless connection using various technologies currently available. For example, instead of a shared media network like 218, or in addition to this network, individual connections or alternative networks such as power line or telephone line or wireless networks symbolized by lines 694, 696, 698 and 700 may be used. Specifically, lines 694, 696, 698 and 700 may represent Home PNA telephone line networks which may have only one (or more) peripherals attached thereto, or Category 5 LAN droplines with only one (or more) peripherals attached thereto, or power line networks each having one or more peripherals attached thereto offered by Inari or Itran or Intellon to save the expense of rewiring the home to add a network. In addition, the connection from the gateway to each peripheral may be by a wireless network such as those offered by Blue Tooth or specified in the 802.11 standard. In addition, the drop lines 694 etc. may each be a separate, dedicated coaxial line or twisted pair. The gateways 20 and 30 in FIGS. 1 and 214 in FIGS. 2 and 308 in FIG. 3 will each have a plurality of individual line driver modules which can be coupled to the gateway backplane. Each module is designed to drive a different type of network connection or dedicated line. All these line driver modules receive IP packets from the routing process in accordance with whatever peripherals are coupled to each line and drive them onto the particular type of media the driver is designed to drive using whatever protocol the particular line requires. Line driver circuits for each of the dedicated and shared media types identified above are known. Driver modules for indivual coaxial cables that were previously installed in a home to distribute CATV signals simply include multiplexers to transmit FDMA separated upstream and downstream logical channels in the bandwidth not used by the analog CATV signal.

The peripherals may include, but are not limited to settop decoders 220 and 222, digital phones 224 and 226, digital VCR 228, and personal computer 230. Upstream requests for programs and services and upstream data such as IP packets from these peripherals are encapsulated into Ethernet packets and sent to gateway 214 and cable modem 216. There, the Ethernet headers are stripped and the requests and upstream data are transmitted on HFC 200 on the upstream logical channel(s) that are devoted to upstream traffic. The cable modems in cable modem bank 204 recover the upstream requests and data and transmit it over data path 206 to a computer 232 in the pull multiplexer. The requests are routed to the culling switches in all embodiments and to the servers that supply the raw input data in some embodiments. The upstream data is routed to the appropriate telephony interface circuitry or internet server/gateway/router for transmission to the host or device on the other side of the transaction.

Figure 3:
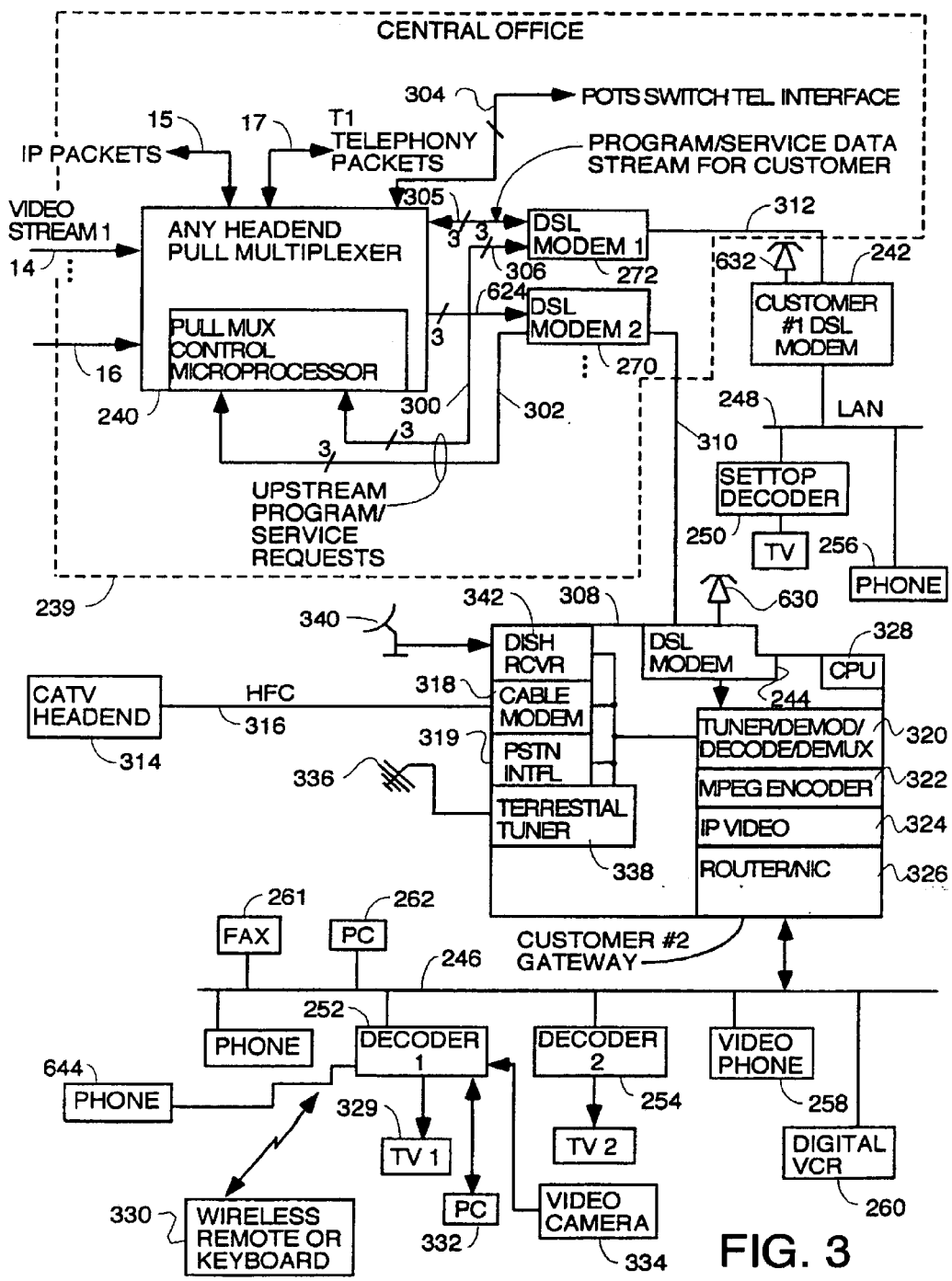
FIG. 3 is a block diagram of an alternative embodiment according to the teachings of the invention wherein the pull multiplexer at the headend delivers requested video-on-demand programs and services via DSL connections to the individual subscribers.

Referring to FIG. 3, there is shown a DSL embodiment of a system that employs a DSL headend multiplexer within the genus of the invention. FIG. 6 is a block diagram showing more detail of a DSL multiplexer that can be used as the headend cherrypicker in the DSL environment. The reader should refer jointly to FIGS. 3 and 6 for the following discussion. Operation of this embodiment is similar to that of FIG. 2 except that the downstream and upstream medium to each customer premises is a DSL telephone line so there is no sharing of the upstream and downstream medium by data bound for different customers.

Each customer has a DSL modem such as 242 and 244 which couples the DSL line to an Ethernet or other local area network such as 246 and 248 coupled to all the peripherals at the customer premises. The peripherals can include but are not limited to settop decoders 250, 252 and 254, phones 256 and 258, digital VCR 260, FAX 261, personal computer 262 or network computing appliances and can include household appliances that are internet ready for remote service calls and diagnosis or remote control. Some of the peripherals generates upstream requests for programs and/or services, and can generate them in any way. Typically, upstream requests for programs and services are generated by selection from a menu displayed on the peripheral such as a television coupled to a settop decoder. The menus are generated on the TV screen, computer screen, phone or FAX display from downstream menu data transmitted on a management and control channel of the DSL line to each customer premises, said downstream menu data encoding all available programs and/or services.

Each peripheral may also generate upstream data for transmission out on a wide area network 600 or a T1 line 602 or other wideband data delivery network. In addition, conventional analog telephones (not shown) can be connected to POTS outputs of the DSL modems at each customer premises, and they can generate upstream analog POTS signals which are transmitted over the POTS baseband channel of the DSL line to the DSL modem at the headend. At the headend DSL modem, the POTS analog signals are recovered and output at POTS outputs. Each POTS output of a DSL modem is coupled by a bidirectional tip and ring pair such as 604 for customer #1 and 606 for customer #2 to a CO POTS switch 608.

In addition, video phone 258 and digital FAX 261 coupled to the LAN at each customer premises can generate digital telephony data such as video conference pictures and audio that needs to be transmitted upstream for routing to the WAN server or T1 interface circuitry at the headend or via a satellite uplink via dish 340 and dish transceiver 342 for delivery to the destination. In addition, other peripherals coupled to a customer LAN such as personal computers 262 and may also generate upstream data that needs to be delivered to its destination by WAN 600 or T1 line 602 or a dish uplink or via PSTN interface circuitry 319 and a conventional telephone line such by a DirectPC PSTN upstream link.

The requests and upstream telephony and other data are transmitted to the customer gateways or DSL modems as Ethernet or other LAN packets. For example, at customer #2 gateway 308, the gateway or its internal DSL modem 244 strips off the Ethernet headers and CRC bits after error correction and transmits the requests and data to the appropriate place. All requests for programs/services are transmitted upstream either via the DSL line 310 to the DSL central office or on the upstream logical channel of the HFC 316. All upstream data that needs to be delivered to its destination via WAN 600 or T1 line 602 is transmitted upstream via DSL modem 244 or upstream to the CATV headend via cable modem 318. All upstream data that will be delivered to its destination by a satellite uplink or a PSTN connection is delivered to the proper interface circuit in gateway 308 such as dish transceiver 342 or PSTN interface 319.

Typically, requests for programs/services are transmitted on a management and control channel on an upstream logical channel transmitted on a carrier of a bidirectional channel that is frequency division multiplexed from the DSL baseband POTS telephony channel and the DSL wideband downstream only logical channel. Bidirectional IP packet and telephony data such as video conference data and Internet access data is transmitted both upstream and downstream on upstream and downstream logical channels of the bidirectional channel, or, in alternative embodiments, may be transmitted on upstream and downstream logical channels of the 1.544 Mbps wideband DSL channel. Other downstream only wideband data such as video-on-demand and other services are transmitted in the 1.544 Mbps wideband downstream only DSL channel, or, in alternative embodiments, in a separate downstream logical channels on 1.544 Mbps wideband data channel that is FDMA multiplexed from the other channels. The DSL modems at the customer premises and the head end each transmit and receive telephony, IP packet, management and control data, video-on-demand data and other service data on separate logical channels on the appropriate carriers and channels as described above.

A DSL modem such as 270 and 272 at the headend is devoted to each DSL line to a particular customer. Each DSL modem at the headend has a conventional structure. DSL modems are commercially available from 3COM. Each DSL modem at the headend and the customer premises functions to send and receive information on three channels: a separate analog channel for "plain old telephone service" (referred to herein as POTS); a high speed wideband downstream channel based upon T1 specifications in increments of 1.536 Mbps up to 6.144 Mbps (referred to herein as the wideband channel); and, a bidirectional channel provided in increments of 64 Kbps up to 640 Kbps (referred to herein as the bidirectional channel and which carries requestes and upstream data in the preferred embodiment). DSL service is described in Horak & Miller, Communications Systems and Networks, Voice, Data and Broadband Technologies (1997) M&T Books, Foster City, Calif., ISBN 1-55851485-6 which is hereby incorporated by reference.

At the headend, telephony data packets arrive on line 17 from the T1 interface circuitry 610 (T1 interface chipsets are commercially available). Further, analog telephony signals generated from "plain old telephone service" (hereafter POTS) arrive from a central office POTS switch 608 on line 304 in FIG. 3 which corresponds to each customer's tip and ring pair in FIG. 6, of which pairs 604 and 606 in FIG. 6 are typical. The POTS lines for each customer are connected to POTS inputs of the corresponding DSL modem.

Digital telephony packets reach the DSL modems a different way. The pull multiplexer 240 in the central office 239 culls out digital telephony packets addressed to each separate telephone number using culling information on lines 614 and 616. This culling information is generated by control computer 618 from upstream program/service requests received on lines 620 and 622 from the DSL modems 270 and 272. The requests on line 620 are customer #1's requests, and line 622 carries customer #2's requests. The DSL modems recover these requests from the bidirectional upstream channels of DSL lines 312 and 310 of customers #1 and #2, respectively. The headend cherrypicker 240 routes the telephony data packets to the appropriate DSL modems 272, 270, etc. This routing may be by way of a separate data path to the DSL modem (not shown) or over buses 305. In the preferred embodiment, the telephony packets are simply put on a separate logical channel (separated from the video and other service packets by header information) in the input data stream to the DSL modems. The slash marks in these lines symbolize embodiments that have three separate inputs to each headend DSL modem: one for POTS telephony, one for downstream management and control data and downstream IP data and other data not requiring high bandwidth; and one for high bandwidth downstream data such as requested video-on-demand programs and services or pushed programs and/or services. In embodiments where the headend DSL modems have a single digital data input, the telephony packets, IP packets and video-on-demand packets and other service packets in the input stream from the cherrypicker 240 are culled out in the modem by information in the headers in accordance with management and control messages received from the cherrypicker. These management and control messages tell the DSL modem which channel and logical subchannel to use to transmit each packet. These management and control messages are sent to the DSL modems from the control computer 618 via the data paths 626 and 628 in FIG. 6. The DSL modems use those control messages for two functions. First, these messages are used to control the DSL modem modulators to get the requested and pushed programs on the logical channels and subchannels specified in the message. Second, these messages are sent to each customer on the bidirectional channel to tell the customer gateway or DSL modem on which channels and subchannels it can find the requested and pushed data so the gateway or DSL modem can properly tune its tuners to recover the requested and pushed data.

Upstream telephony, request data and other upstream data from the telephones and other peripherals at the customer premises are encapsulated into Ethernet packets and addressed to a DSL modem or gateway. In the case of customer #1, the upstream data on the LAN is addressed to DSL modem 242, and in the case of customer #2, the upstream data is addressed to the gateway 308. The gateway 308 routes the telephony packets and upstream request data and other data to be transmitted to the headend to an internal DSL modem 244. The DSL modem 244 transmits the upstream data and telephony packets on the bidirectional channel (or an upstream logical channel in the broadband channel in some embodiments). Analog POTS signals from any conventional telephones 630 and 632 coupled to the DSL modems 244 and 242 are transmitted upstream as analog voice and POTS call control and call progress signals on the baseband POTS channel.

At the headend DSL modem for each customer, the analog voice and call control POTS signals are recovered and transmitted on the appropriate tip and ring pair, e.g., 606 and 604 for customers #1 and #2, to the CO POTS switch 608. Upstream request data and other upstream data such as IP packets are recovered by the DSL modem of each customer from the bidirectional channel or logical upstream channel of the broadband channel and sent to the control computer 618 via data paths 620 and 622 for customers #1 and 2, respectively. The control computer 618 then routes these upstream data packets either to the T1 telephony interface circuitry 638 via line data path 636 or WAN gateway/router/server 640 via data path 642.

The DSL modems 272, 270, 242 and 244 send and receive upstream and downstream management and control packets on the bidirectional channels of DSL lines 310 and 312. The management and control channels are transmitted on a carrier centered on 95 MHz which provides 8 Kbps of bandwidth for management and control messages and handshaking protocol between the subscriber and CO. This carrier of the bidirectional channel is used to test the copper pair transmission path and to provide approximately 16 Kbps of upstream D-channel bandwidth from the subscriber premises to the CO for request messages and upstream data such as IP packets, video conferencing data, etc. In alternative embodiments, the 1.544 Mbps broadband channel is bidirectional and the upstream and downstream data are multiplexed into separate logical channels by TDMA, FDMA, CDMA or DMT. In other alternative embodiments, the D-channel is bidirectional and reserved for upstream data that can be sent within its bandwidth and higher bandwidth upstream traffic like video conference data of higher quality is multiplexed onto an upstream logical channel of the broadband channel with the downstream logical channel carrying compressed video and and downstream IP packets of requested and pushed video programs and services.

The high bandwidth data of downstream requested programs and services and pushed programs and services is modulated onto the broadband 1.544 Mbps channel extending from 100 to 500 Khz. The high bandwidth channel typically carries downstream only (CO to subscriber) digital data and provides 1.544 Mbps transport (1.6 mbps with overhead) for carrying digitized compressed video data and IP packets. The lower edge of the high bandwidth channel is set at 120 Khz, which is chosen to minimize channel loss and allow appropriate bandwidth for the baseband telephony channel and the bidirectional channel. This minimizes interference from impulse noise. The combined digital downstream signal utilizes the DS1 bit map specified by ANSIT 1.403-1989.

Although the broadband channel generally is downstream only, in some embodiments, high bandwidth upstream traffic can also be multiplexed thereon. There is no need for multiplexing if data transmission is unidirectional downstream on the high bandwidth channel since only the programs and services requested by one user are on that users DSL line. If, however, upstream video conference telephony and IP packet data is to be transmitted from the peripherals to the T1 interface circuitry 638 or the WAN server 640 on the high bandwidth channel, that data may be time division or code division multiplexed onto an upstream logical channel of the 1.544 Mbps channel.

Gateway 308 also include circuitry to interface the LAN 246 at the customer premises #2 to several other sources of incoming programming and/or data and to send data out on upstream mediums other than the DSL line such as the PSTN or a satellite uplink or an HFC connection to a CATV headend. The details of the gateway 308 are given in the patent application HOME NETWORK FOR ORDERING AND DELIVERY OF VIDEO ON DEMAND, TELEPHONE AND OTHER DIGITAL SERVICES, filed Jan. 14, 2000, Ser. No. 09/483,681 which is hereby incorporated by reference, but some of the circuitry will be summarized here for completeness. For example, the gateway couples a CATV headend 314 and HFC data path 316 to LAN 246 via a cable modem 318 and various other circuits in the gateway that perform necessary services and routing of data to and from the LAN 246. The gateway includes tuner, A/D, decoder, demultiplexer and demodulation circuitry represented by block 320 which performs various functions to interface the gateway to HFC 316. The HFC 316 can carry downstream conventional FDMA analog video broadcasts for video conferencing or CATV delivery, digital video broadcasts and/or downstredam DOCSIS data modulated onto upstream and downstream carriers. Thus, the gateway 308 can also request video-on-demand, video conferencing, wideband internet access or other services via the upstream logical channel on the HFC 316 as an alternative to DSL delivery.

The gateway 308 has a tuner for each downstream carrier on the HFC, all of which are symbolized by block 320. The analog video tuner (not separately shown) tunes to whatever analog CATV video channel or video conferencing channel which has been requested and outputs an RF signal which is then digitized and demodulated to a baseband NTSC, PAL or SECAM downstream digital video signal. This data is at too high a bandwidth to send over the LAN 246, so the data must be compressed. To do that, a video decoder in block 320 (not separately shown) converts the signal to YUV format and then it is compressed in an MPEG II or other encoder 322. Next, IP video circuit 324 encapsulates the compressed video into IP packets addressed to the peripheral which requested the program, and the IP packets are sent to a router/network interface circuit 326 which routes the packets onto the correct LAN (there may be more than one LAN coupled to the gateway) and drives them onto the LAN media. A CPU 328 coordinates all this activity.

If another user at customer premises #2 ordered a second video-on-demand program to be delivered by HFC in addition to a video-on-demand program via wireless keyboard or wireless remote 330, another tuner is tuned by computer 328 to the appropriate HFC video-on-demand carrier and rejects all other signals. The output of the tuner is then digitized and will contain digitized video and audio signals and may also contain IP packets of associated data. All this data will be on different program slots of one or more downstream channels from the CATV headend 314. A QAM or other demodulator in block 320 then recovers the constellation points encoding all these signals and data and a transport demultiplexer in block 320 separates the video, audio and associated data constellation points into separate streams of decoded data. Conventional conditional access decryption follows and the resulting data is usually compressed into MPEG packets by MPEG encoder 322 and encapsulated into IP packets by IP video circuit 324 and routed to the peripheral that requested it over LAN 246 via router/NIC 326.

At the settop decoder boxes such as 252, the data or requested and pushed video-on-demand programs or video conference data delivered either by HFC 316 or DSL line is received and converted into NTSC, PAL or SECAM video signals for the associated television, such as TV 329. The settop decoders such as 252 may have a video phone or conventional video camera 334 coupled thereto to generate the upstream portion of a video conference as conventional NTSC, PAL or SECAM format video signals with audio. The settop decoder includes conventional circuitry to receive, digitize, compress and packetize upstream video and audio signals and address the packets to the router/NIC 326 in gateway 308. The router sends the upstream video conference packets to the dish transceiver 342, the cable modem 318 or the DSL modem 244 for upstream transmission via satellite uplink, HFC 316 or DSL line 310, respectively. Thus, video conferencing can be achieved using the settop decoder 252 and television 329 for downstream data and the video camera 334 and settop decoder 252 for upstream video and data transmission.

Returning to the consideration of video-on-demand and pushed programs and services, any associated data to be used with a video-on-demand or pushed program (such as a pushed home shopping program), to be sent to, for example, a phone 644 near the TV being viewed (for home shopping transactions) or personal computer 332, is converted to a format suitable for the personal computer or the phone. Both the phone 644 and the PC 332 are plugged into the settop decoder 252 so as to receive the associated data so as to be able to interact with the vidoe-on-demand or pushed program being viewed for, for example, impulse buying.

Gateway 308 also includes tuner for DOCSIS data such as wideband internet access IP packets transmitted downstream on the HFC 316, said tuner being included within cable modem 318.

The gateway 308 can also interface the LAN 246 to a conventional TV antenna 336. A tuner 338 under control of CPU 328 tunes to whatever conventional broadcast channel has been requested. The RF output of the tuner is then digitized in an A/D converter in block 320 and demodulated by a video demodulator which is part of block 320 to generate an NTSC, PAL or SECAM baseband signal. A video decoder which is part of block 320 converts the video signal to YUV format and MPEG encoder 322 compresses the video data. IP video circuit 324 encapsulates the output of the MPEG encoder and sends it to router/NIC 326 where it is routed to the appropriate settop decoder circuit for the TV that ordered the broadcast.

The gateway 308 can also interface the LAN 246 at customer premises #2 to a satellite dish 340. The satellite dish can send multiple forms of signals to the gateway. For example, analog video signals such as C-band subscription broadcast video can be received and/or digital video can be received such as DirecTV. Also, digital data services such as DirectPC may also be received. A separate tuner for each of these services is either part of dish receiver 342 or part of block 320. The DirecTV tuner will feed a QAM demodulator as part of block 320 which detects the actual symbols sent for each constellation point and outputs a digital stream to a transport demultiplexer which, under the guidance of CPU 328, separates out the MPEG packets in the subchannels or program slots carrying only the programs that have been requested or pushed programs. The MPEG packets are then sent through a transcoder which is part of block 320 to adjust the bandwidth of the isochronous video data to the available bandwidth on the LAN 246 for current load conditions. The transcoder circuit is implemented on commercially available integrated circuits which were formerly manufactured by Imedia and are now manufactured by Terayon Communications Systems, of Santa Clara, Calif., the assignee of this patent application. The transcoder receives an input from the CPU 328 regarding how much compression is needed and then uncompresses the input MPEG packets and recompresses them down to the new bandwidth as new MPEG packets. A conditional access circuit then authenticates the requester as a subscriber and decrypts the data so that it can be viewed. The decrypted MPEG packets are then sent to IP video circuit 324 for encapsulation into IP packets and then to router/NIC 324 for routing and encapsulation into Ethernet packets and driving onto LAN 246. At the settop decoder box to which the Ethernet packets are addressed, they are received, decompressed and converted back into a video signal which is coupled to the TV.

DirectPC signals arriving from dish 340 are tuned in dish transceiver 342 under control of CPU 328 and the output is coupled to a QPSK demodulator which recovers the IP packet data of the requested service. The IP packets are then sent directly to router/NIC 326 for routing and encapsulation into Ethernet packets and transmission to one of the personal computers such as 332 or a network computer (not shown).

Analog video signals such as C-band broadcasts that have been requested are tuned by the dish transceiver 342 under command of the CPU 328. The output RF signal is digitized and a video demodulator in circuit 320 converts it to baseband NTSC etc. A video decoder in circuit 320 then converts the NTSC signal into YUV format for compression in MPEG encoder 322. The compressed data is then sent to IP video circuit 324 for encapsulation into IP packets and from there to router/NIC 326 for routing and encapsulation into Ethernet packets and transmission over the LAN to the requesting settop decoder.

Gateway 308 and its LAN(s) and other input devices may be substituted for gateway 214 in FIG. 2 and gateways 28 and 30 in FIG. 1.

The DSL headend multiplexer 240 works the same way as the headend multiplexer 10 in FIG. 1 with regard to video-on-demand programs. Requests from the customers received by control computer 618 are converted to PIDs and transmitted to video servers 646 and 648 via lines 650 and 652. These video servers then output the MPEG packets of the requested programs on data paths 654 and 656 from video server 1 and data paths 658 and 660 from video server 2. Splitters 662 and 664 copy these data streams to each of the culling switches 666 and 668. The splitters also receive input IP packets from WAN gateway 640 via path 15 and from T-carrier interface circuit 638 via data paths 17 and 672. These IP packets are copied out to the culling switches also. The culling switches cull out the MPEG packets of the requested video and pushed video programs and the IP packets of the requested services from the data streams from the splitters on data paths 676, 678, 680 and 682 in accordance with culling data given to them on lines 614 and 616 from the control computer 618. The culled out data packets for customer #1 appear on line 684, and the culled out data packets for customer #2 appear on line 686. Optional bandwidth recoders then adjust the bandwidth of the resulting data streams in accordance with commands from the control computer 61B transmitted via lines 692 and 694. The resulting output data on buses 305 and 624 are transmitted downstream by the DSL modems.

***In some embodiments within the genus of the invention, the pull multiplexer assumes that all cable modems and gateways have a sufficient number of tuners to tune in all the programs and/or services requested from a single customer premises. In such embodiments, the pull multiplexer simply gathers upstream program/service requests and culls out the packets that encode the data of the requested programs and services. These packets are then assembled into output streams for the appropriate media coupling the pull multiplexer to the requesting customer and downstream messages are sent to the customer's modem or gateway telling it on which media, channel and subchannel/program slot each requested program and/or service can be found. In embodiments where there is only one medium coupling the pull multiplexer to all the customers, the pull multiplexer just assembles the requested program and service packets into one or more output streams to be transmitted in a corresponding number of logical channels. The pull multiplexer just puts the requested programs and/or services from a single premises into whatever subchannels or program slots are available in logical channels that are not fully utilized and sends downstream messages to the customer's modems or gateways telling each customer the logical channel(s) and subchannel(s) upon which the program(s) and/or service(s) requested by that customer can be found.

This assumption that all customer modems/gateways have a sufficient number of tuners to tune all the requested programs and/or services and that they can be spread out to whatever logical channels and subchannels are not being utilized is inconvenient for customers. Specifically, for a customer that might have 3 to 5 programs and/or services requested simultaneously, that customer might need as many as five tuners in his gateway/modem in a worst case scenario. This unnecessarily drives up the expense for the customer.

Optionally, in some species within the genus, the cherry picker has a management process that pulls the requested programs and services onto the downstream medium 26 in the most efficient way. Such a process is illustrated in the flowchart of FIG. 5. This management process starts at steps 344 and 346 by receiving upstream program and service requests. Next, step 348 analyzes the incoming program and service requests to determine from which customer premises they came. Step 350 determines how many different program(s) and/or service(s) have been requested from the same customer premises. Step 352 then determines how many tuners each customer has in his gateway/cable modem such as 28 and 30.

Next, in step 354, the management process determines which channels and subchannels have available capacity.

Then the management process determines which channels and program slots to transmit the requested program(s) and/or service(s) on to enable all the requested program(s) and/or service(s)requested by the user to be received. The first step in that process is step 356 where the number of requested programs and/or services from each customer is compared to the number of tuners that customer has.

Next, the process of generating the output streams for all the customers with outstanding requests starts by assigning a variable N (which will be the customer currently being processed in the loop) to an intial value of one in step 360. Step 362 sets the customer number identifying which customer is being processed to the value of N. Test 364 then determines if customer #N has only one tuner. If so, test 366 determines if the number of requested programs and/or services by customer N is greater than one. If not, then the question is simply one of which logical channel in the downstream has the requisite number of subchannels available to carry the components of the requested program and/or service. Step 368 on FIG. 5B finds a logical channel with a number of subchannels open that at least equals the number of components to be transmitted in the program and/or services requested. Step 370 then sends the PIDs, IP addresses and/or other identifying information for the components of the program/service that has been ordered to the culling switch that is culling out packets for the output stream being generated for the logical channel having the available subchannels found in step 368. Step 372 sends a downstream message to the gateway or cable modem of customer #N telling it which logical channel and subchannel the components of the requested program/service will be transmitted on so that the CPU in the cable modem or gateway can tune the tuner to the right carrier and demultiplex the components of the requested program/service from the designated subchannels. Step 374 sends a message to the downstream transmitter of the logical channel on which the requested components are going to be sent identifying which packets in the input stream of the transmitter are to be put on which subchannels. Step 376 then increments N by one to start work on the next customer. Step 378 then determines if the last customer's requests have been processed, and, if so, processing vectors back to step 346 to receive new program/service requests, as symbolized by step 380. If test 378 determines that the last customer has not had her requests processed, processing vectors back to step 362 along line 379 after incrementing the value of N in step 381 to start the loop again to process the next customer.

Returning to the consideration of step 364, if customer N has more than one tuner, then processing flows along line 365 to step 382 is performed to determine if the number of requested program(s) and/or services is greater than the number of tuners customer #N has. If not, step 384 is performed to find one or more logical channels with a sufficient number of open subchannels to carry all components the requested program(s) and/or service(s) to customer #N. Next, step 386 is performed to send the PIDs, IP addresses and/or other identifying information for the components of the program/service ordered by customer #N to the culling switch or switches that are generating the streams of data that are to be modulated onto the logical channel or channels located in step 384 that will be used to transmit the requested program(s)/service(s) to customer #N. The switch or switches then use those PIDs etc. to cull out the packets of the requested program(s)/service(s) and assemble the output streams. Generally, all the components for a single requested program or service will be transmitted on the same channel, so the pull multiplexer tries to find a logical channel that has a sufficient number of open subchannels to carry all the components for a particular program. For example, if a requested video-on-demand program has a video, audio and data component, then a logical channel with at least three open subchannels is preferred. However, the different components of a requested program/service can be sent on different logical channels if necessary as long as the downstream messages tell the cable modem or gateway where to find all the components. Step 388 is then performed to send a downstream message to the gateway or modem of customer #N telling it which channel(s) and subchannel(s) it will find the components of the requested program(s) and/or service(s) will be found. Processing then flows along line 389 to step 390. Step 390 sends a message or messages to each of the downstream transmitters transmitting the logical channels located in step 384 to instruct them which packets (identified by PIDs etc.) to modulate onto which specific subchannels so that the customer will find all components of the ordered program(s)/services(s) on the logical channels and subchannels indicated in the downstream messages. Steps 392, 394, 396 and 398 increment N by one, determine if the last customer has been processed, and, if not, vector back to step 362 and, if so, vector back to step 346.

Figure 5A:
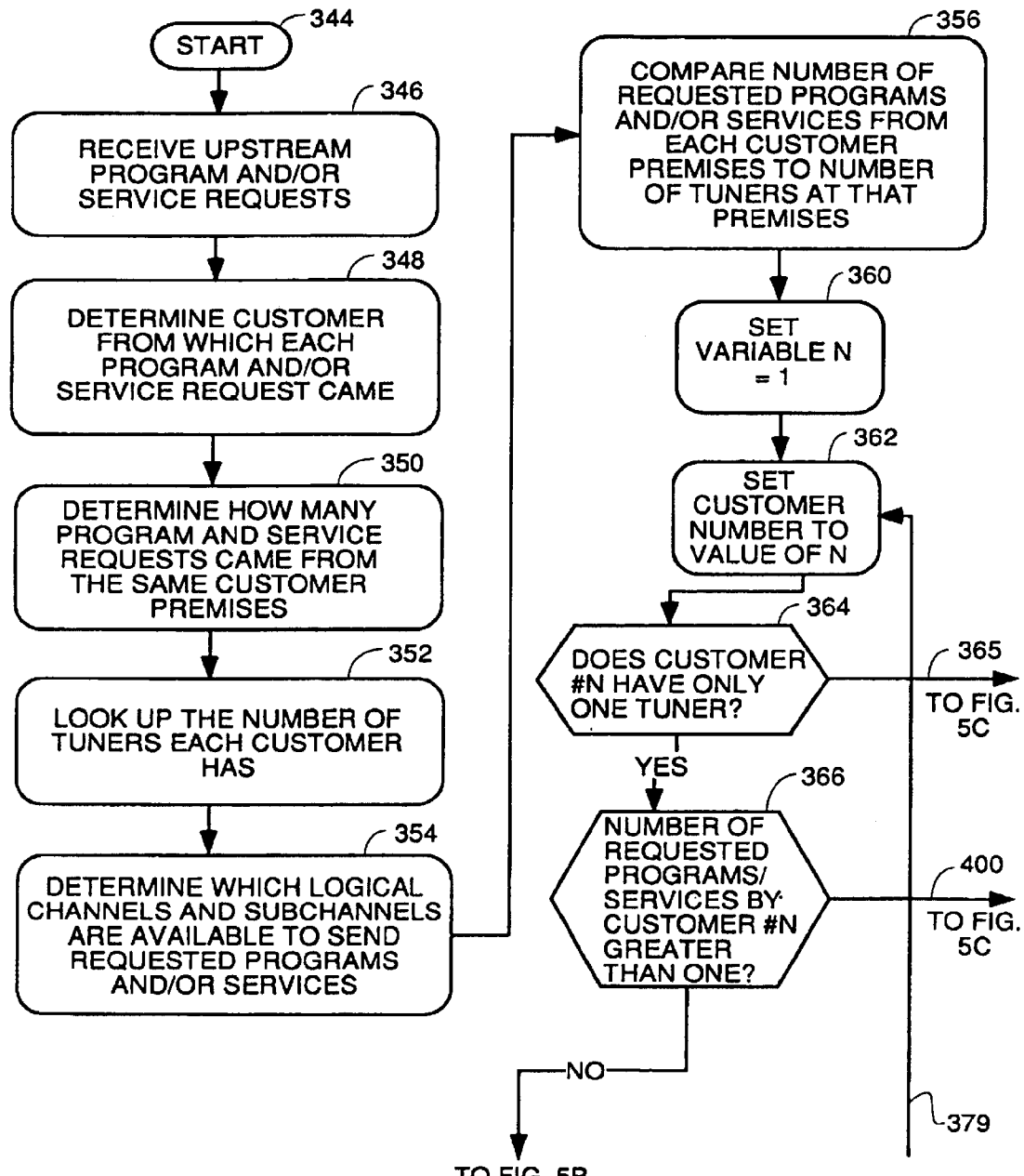
FIGS. 5A through 5G are a flow diagram of an optional process carried out in the gateway to optimize assembly of the output data streams for transmission to customers so that the most requests from the most customers can be honored given the number of tuners each customer has.
Figure 5B:
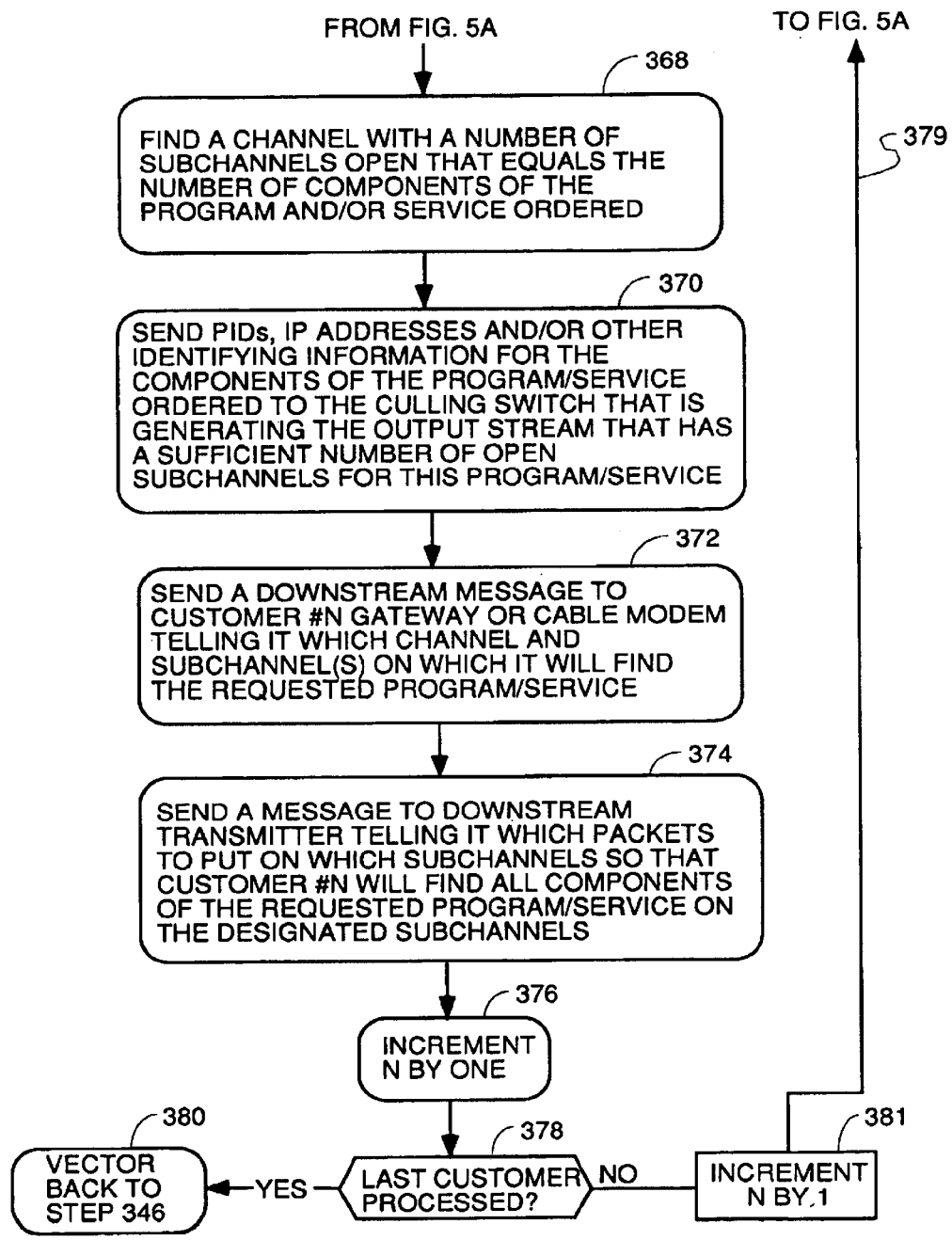
Figure 5C:
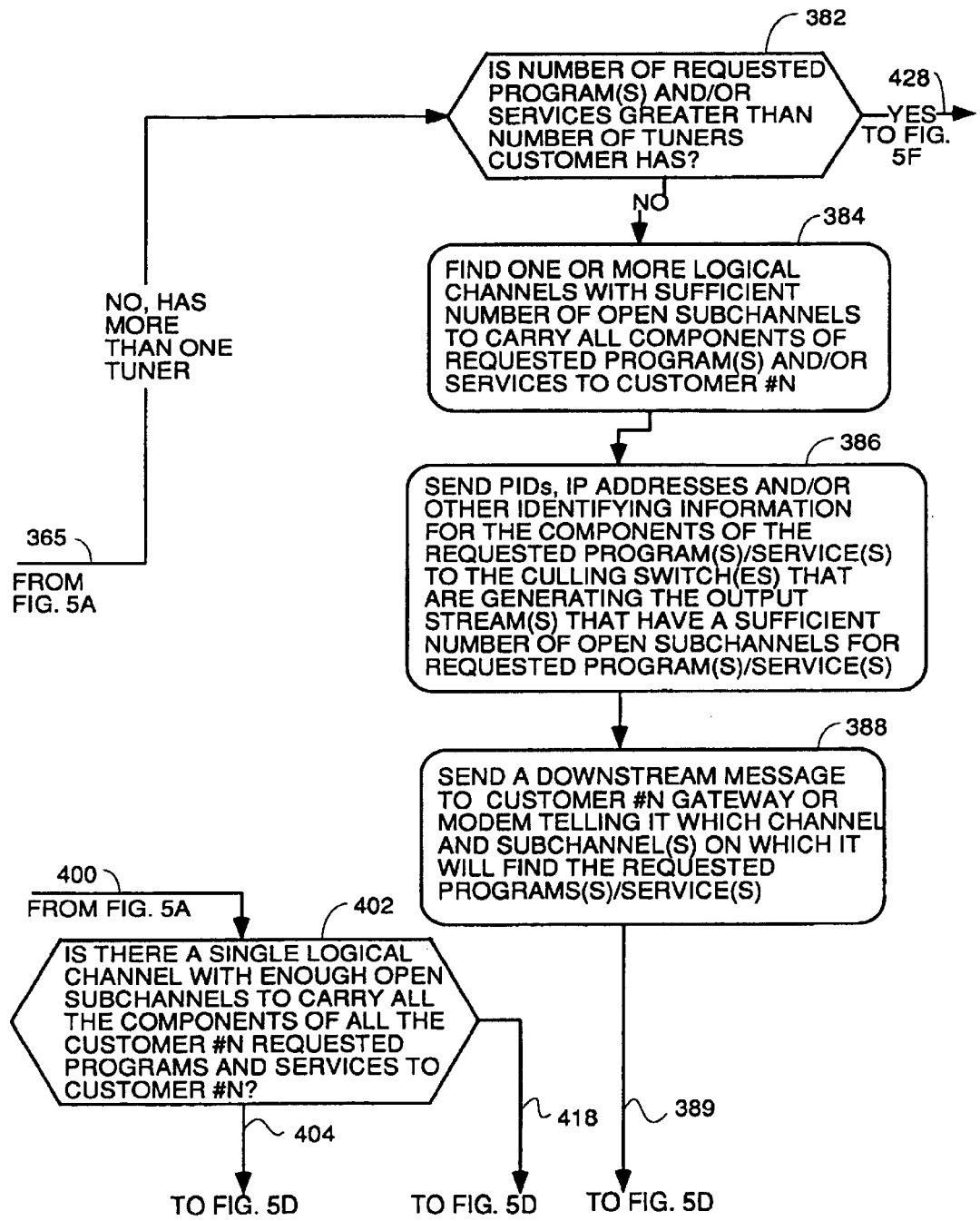
Figure 5D:
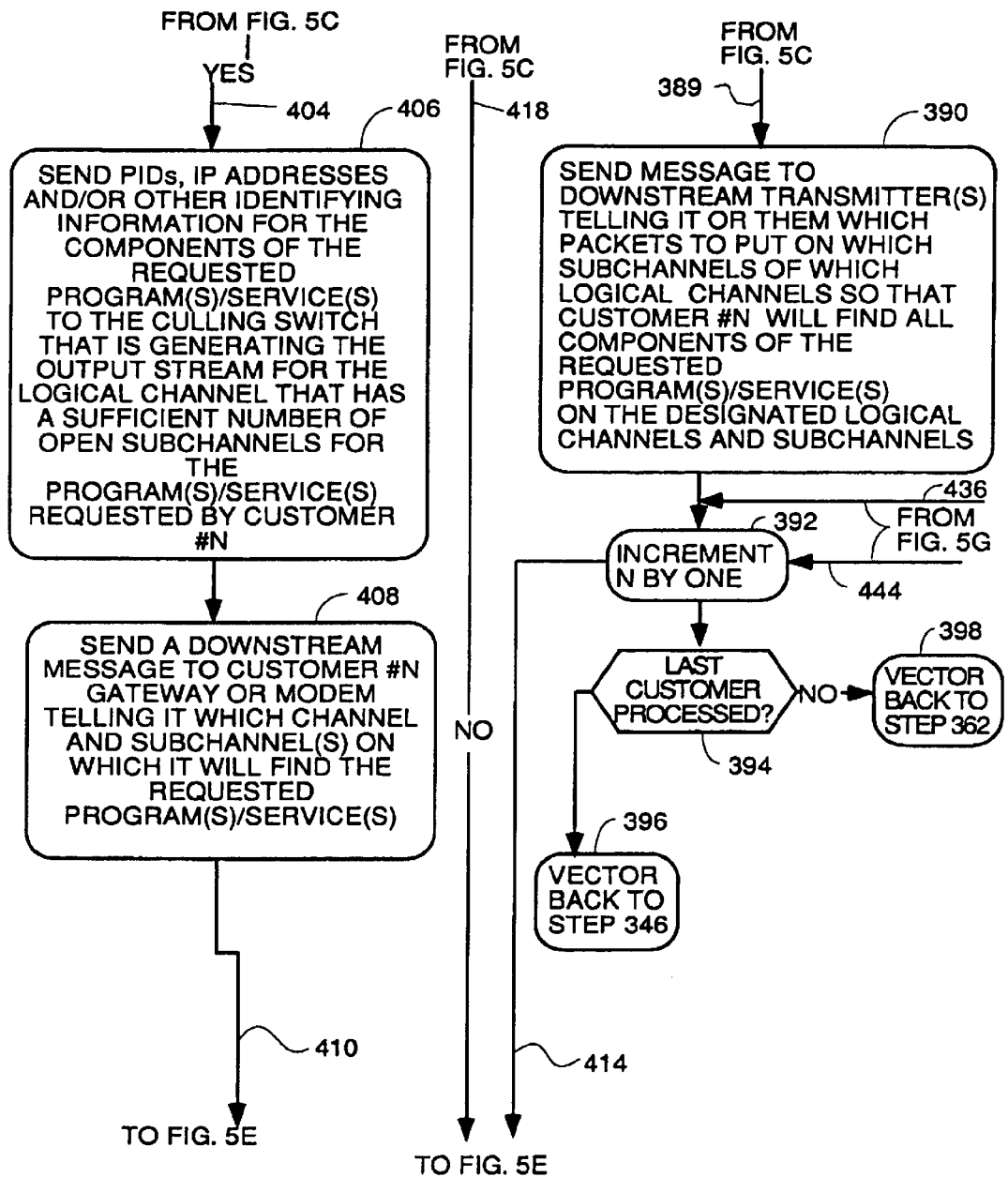
Figure 5E:
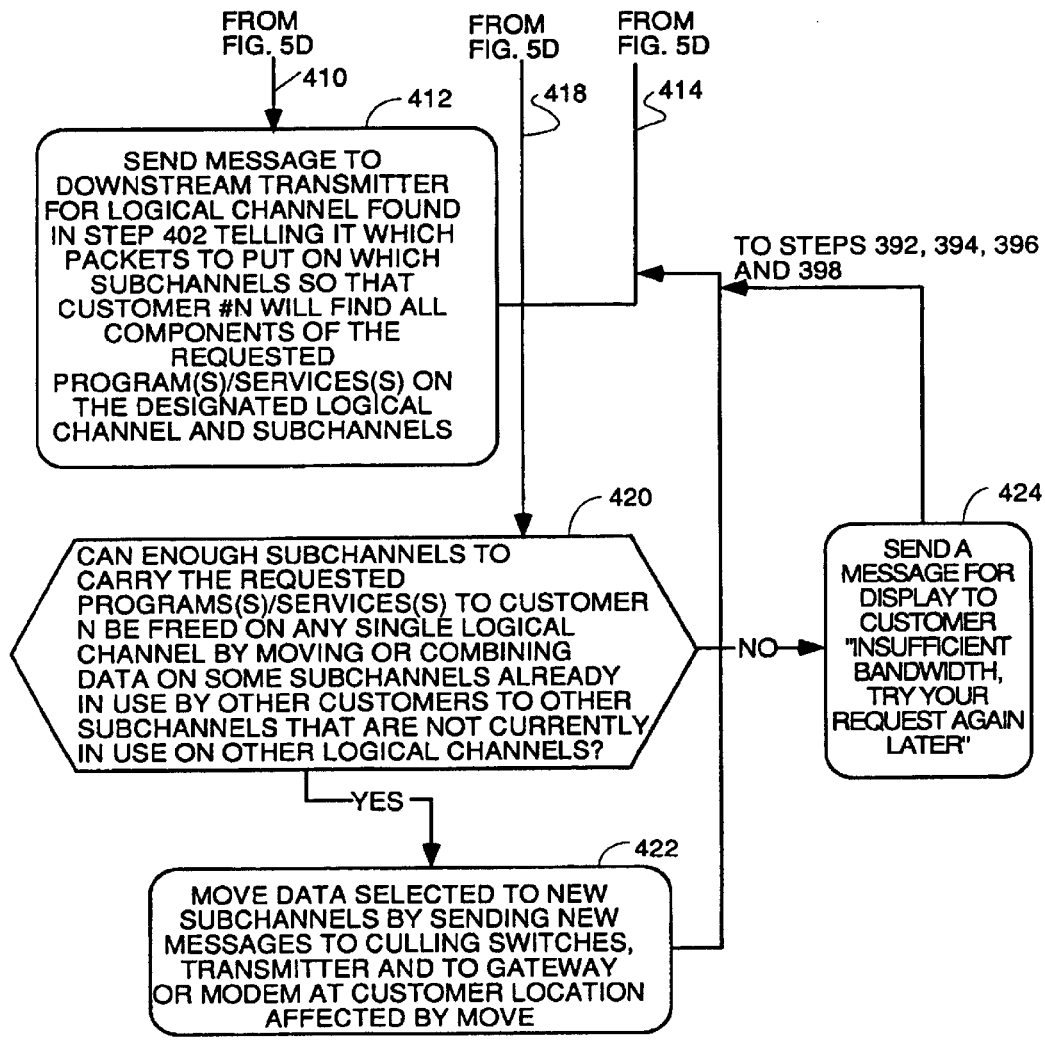
Figure 5F:
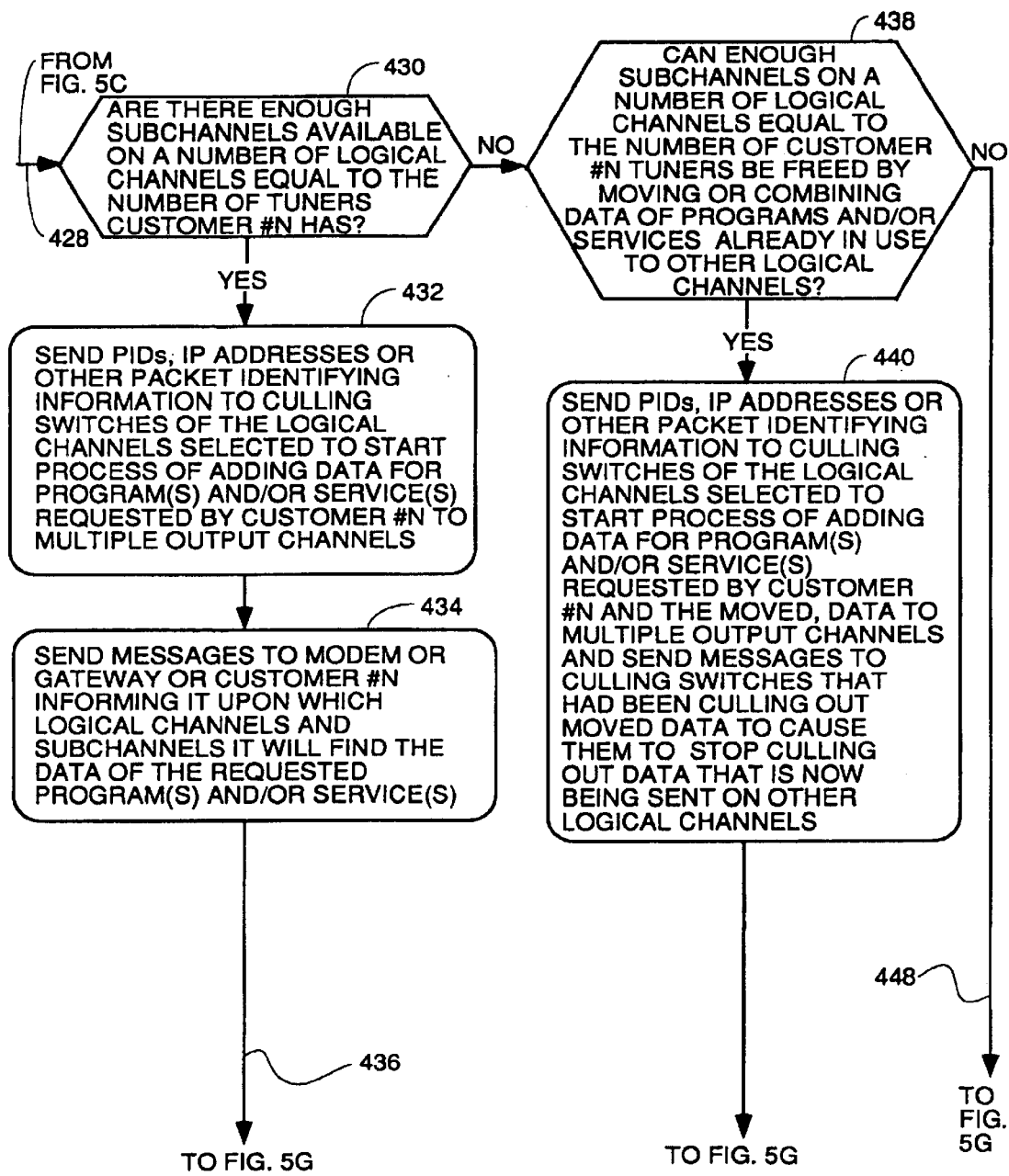

Problems can arise when the number of programs/services requested by a particular customer exceeds the number of tuners that customer has if there are not enough subchannels available to carry the requested data on a plurality of logical channels equal to the number of tuners the customer has. For example, suppose customer #1 has only one tuner in her gateway/cable modem 28 and this tuner is already tuned to logical channel 5 for delivery of one video-on-demand program. Now suppose other residents of customer #1's household request three additional programs and services. If channel 5 has an 18 program slot capacity but there are only two open program slots on channel 5 that are not being used, there is a problem. In such a case, the management process may simply move the program or service customer #1 is currently viewing/using on channel 5 to another channel with adequate unused program slots and then add the three newly requested programs and/or services from customer #1's premises to that channel. The cherry picker will then send a downstream message either addressed directly to customer #1's gateway or cable modem or broadcast to all gateways or cable modems that indicates the channel the program or service customer #1 was already tuned to is now being broadcast on and the fact that the three new requested program(s) and/or(services) are now being broadcast on the new channel and giving the PIDs of those program(s) and service(s) packets. There are a number of different scenarios for matching the number of requests to the available logical channels and subchannels and the number of tuners each customer has. Any process that can accommodate as many requests as possible given the loading of the subchannels and the number of tuners available will suffice to practice the invention. The following steps from the various sheets of the flowchart of FIGS. 5A through 5X are only one example of a process that can do the necessary processing. Returning to the consideration of step 366 on FIG. 5A, if the number of requested program(s)/service(s) is greater than one but customer N has only one tuner, then processing flows on line 400 to test 402. Test 402 determines if there is a single logical channel with enough open subchannels to carry all the components of all the programs and/or services requested by customer N. If there is such a channel, processing flows along line 402 to step 406. In step 406, the PIDs, IP addresses or other information that identifies the packets containing data for the programs/services requested by customer N are sent to one culling switch. The culling switch these PIDs are sent to is the one which is generating the Input data stream to the downstream transmitter which is transmitting the logical channel located in step 402. Next, step 408 is performed to send a downstream message to customer #N's modem or gateway telling it which logical channel and subchannel(s) on which it will find the requested program(s)/service(s). Step 412 is then performed to send a message to the downstream transmitter which is transmitting the logical channel found in step 402. This message tells the transmitter which packets to put on which subchannels of the logical channel so that the customer N gateway or modem will find them where it was told they will be. Processing then vectors along path 414 to step 392. Steps 392, 394, 396 and 398 on FIG. 5D are repeated to increment N and vector processing to the appropriate place to process the next customer or receive new requests.

Returning to the consideration of test 402, if there is no single logical channel that has a sufficient number of subchannels available to carry all the components of the program(s)/service(s) that customer N has ordered, then processing flows along path 418 to test 420. Test 420 determines if enough subchannels to carry all the components of the program(s)/service(s) that customer N ordered can be freed on any single logical channel by moving the data streams on subchannels already in use to unused subchannels on another logical channel. This process will look at the current load on all logical channels and subchannels and compare it to the needed number of subchannels and pick a logical channel that is closest to having a sufficient number of available subchannels. The number of subchannels needed to be freed will be determined and the other logical channels will be examined to determine if there is another logical channel with a sufficient number of available subchannels to which the data can be moved or if the same data on separate subchannels in use by different customers can be combined without adversely affecting the services and/or programs being received by the customer whose data needs to be moved. A combination of data can be made it two different customers are watching the same program and the data is being sent on different subchannels of the same or different logical channels, and if the data is in "synchronization". The data will be in synchronization if it is a broadcast that started at the same time for all users watching it or if the same video-on-demand movie or other production was ordered at the same time by two or more customers.

If such a move or combination can be made to free a sufficient number of subchannels, then the move or combination will be made, as symbolized by step 422.

To implement this move or combination, new PID and/or IP addresses etc. are sent to the culling switches to update their tables so that the culling switch generating the output stream for the logical channel from which the data is being moved will stop culling out the data packets to be moved and the culling switch generating the data stream for the logical channel to which they are being moved will start culling out the data packets. New messages are then sent to the transmitters involved so that they will put the data packets in the appropriate subchannels to which they are being moved on the new logical channel. Also, a new downstream message is sent to the modem or gateway of the customer whose data has been moved telling it where it can continue to find the data of the requested program(s)/service(s). Then steps 392, 394, 396 and 398 on FIG. 5D are performed again to increment N and begin processing the next customer.

Returning to the consideration of step 420, suppose there is no move or combination that can be made to free enough subchannels to send all the requested programs/services to a customer with a single tuner. In such a case, step 424 is performed to send a message for display to the customer indicating there is insufficient bandwidth to deliver all the requested data and requesting that the customer make her request again later. Then steps 392, 394, 396 and 398 on FIG. 5D are performed again to increment N and begin processing the next customer.

Returning to the consideration of step 382, suppose customer #N has more than one tuner, but the number of program(s) and/or service(s) she ordered is greater than the number of tuners in her gateway or modem. If test 382 determines such to be the case, processing vectors to test 430 on FIG. 5F. Test 430 determines whether enough subchannels are available on a number of logical channels equal to the numbers of tuners customer #N has to carry the program(s) and/or service(s) customer #N has ordered. Basically, the load on all logical channels and subchannels is analyzed to determine if enough available subchannels can be found to carry the program(s)/service(s) requested by customer #N on a number of logical channels equal to the number of tuners this customer has. If so, step 432 is performed to send the PIDs, IP addresses or other packet identifying information that can be used to cull out the packets of the program(s)/service(s) requested by customer #N. These PIDs are sent to the appropriate culling switches after the logical channels that have capacity are selected and the requested program(s)/service(s) are divided up into groups that will fit on the available subchannels on various logical channels. Next, step 434 is performed to send messages to the modem or gateway of customer #N informing it upon which logical channels and subchannels the requested program(s) and/or services will be found. Then path 436 is taken to step 392 on FIG. 5D to increment N and begin processing the next customer.

Referring again to step 430, suppose that process 430 could not find enough available subchannels on a number of logical channels equal to the number of tuners the customer has. In that case, processing vectors to test 438. Test 438 determines if enough subchannels can be freed to carry the requested programs and/or services to customer #N by moving the data of programs and/or services in use by other customers to other logical channels or by combining multiple requests for the same data. The combining aspect of the process represented by step 438 represents analyzing new requests to determine if the same program and/or service is already being pulled by another customer on a subchannel or if the same program and/or service is already being broadcast as pushed data. If the requested data is already being pulled or pushed on other subchannels, then the processes represented by step 440 and 442 of sending messages to the customer gateways and the transmitters aand culling switches basically boils down to sending messages to the customer N gateway that tell it the logical channel(s) and subchannel(s) where the requested data is already being broadcasted or pulled by another customer. If the customer does not have enough tuners and the ones the has are already consumed by programs and/or services his family are already using and there are sufficient subchannels available on a logical channel to which one of the customer's tuners is already tuned, then a copy of the broadcast program/service or the program/service already being pulled by another customer is made on the available subchannels of the logical channel to which customer N is already tuned.

If step 438 concludes that enough subchannels can be freed by moving or combining data, then in step 440 the PIDs, IP addresses or other identifying information for both the customer #N requested programs and/or services and the programs and/or services that are being moved or combined are sent to the culling switches for the logical channels on which the customer N requested programs and services are to be sent and the new logical channels for the moved data. Also, messages are sent to the culling switches affected by programs and/or services that have been moved away to cause them to stop culling out the packets of the moved programs. Then step 442 is performed again to send messages to the gateway or modem of customer #N telling it where to find the requested program(s) and/or service(s). Step 442 also sends messages to the gateways and modems of customers whose data has been moved telling them upon which logical channels and subchannels they may now find the data of the programs and/or services they have been viewing or using. Then path 444 is taken to step 392 to begin processing the next customer.

Figure 5G:
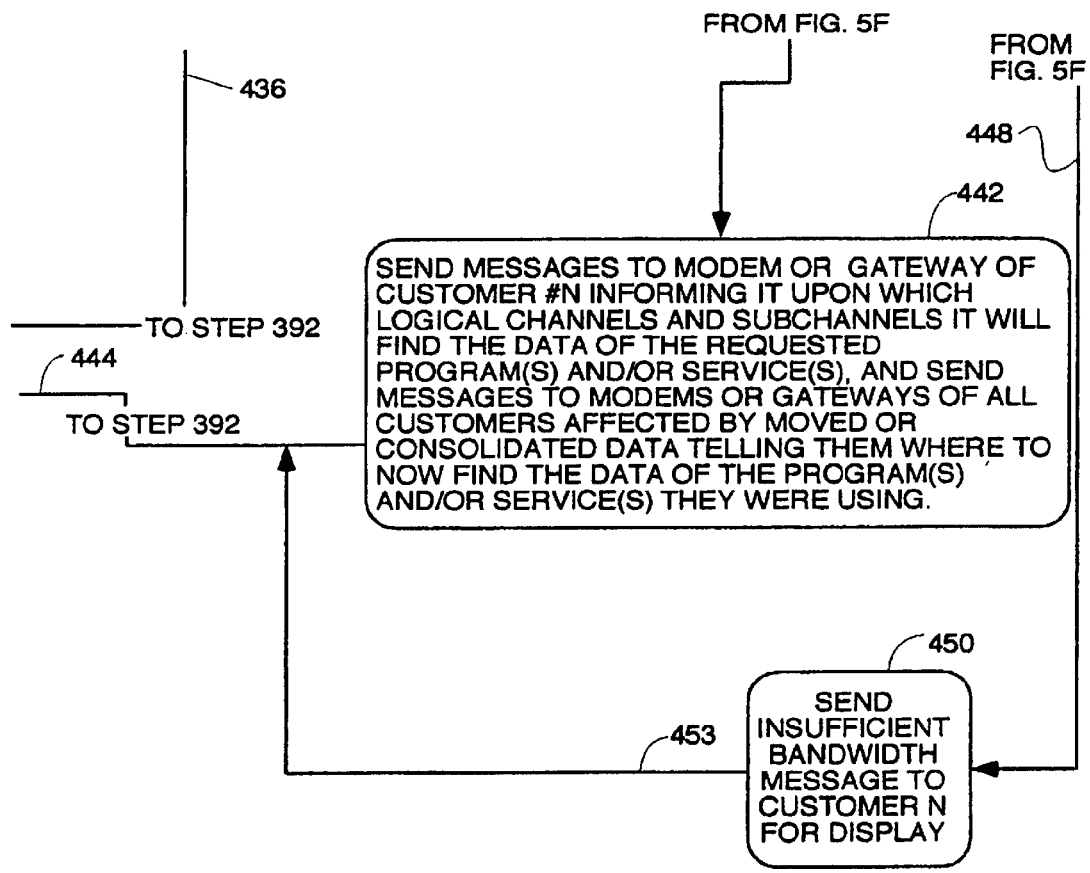

Returning again to test 438, if it is not possible to free enough subchannels to carry the requested programs to customer N by moving and/or combining data, then path 448 is taken to step 450 on FIG. 5G. Step 450 sends an "insufficient bandwidth message" to customer N for display to her on the TV, remote or other device from which she ordered the program and/or service. Path 453 is then taken to step 392 to begin processing the next customer requests or receive new requests.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A process for supplying video-on-demand programs to a plurality of customers over a shared hybrid fiber coaxial cable transmission medium (hereafter HFC) of a cable TV system, comprising the steps:

receiving one or more input streams of MPEG or other compressed video data in packets from one or more video servers;

receiving one or more requests for video-on-demand programs transmitted by said customers over an upstream logical channel on said HFC;

mapping said one or more requests to one or more program identifier codes, and sending messages to one or more video servers telling them which video-on-demand data files to output, and using said program identifier codes to cull out compressed video packets of at least requested video-on-demand programs;

determining the customer from which each upstream request came;

determining how many programs and/or services each customer requested from the same customer premises;

looking up the number of tuners each customer has in his cable modem or gateway;

determining which logical channels and subchannels are available to send requested programs and/or services;

comparing the number of requested programs and/or services from each customer premises to the number of tuners in that customer's cable modem or gateway;

step for culling out packets bearing data of said components of all requested video programs and/or other services from streams of packets output by servers in response to requests sent thereto, and attempting to organize and transmit packets bearing data of all components of the programs and/or services requested by a customer on a number of channels that matches the number of tuners said customer has in his or her cable modem or gateway;

sending one or more downstream messages to said customers telling them which logical channels and subchannels upon which they can find their requested video-on-demand program(s) or other requested services.

2. The process of claim 1 further comprising the step of analyzing the bandwidth availability of logical channels and subchannels on said HFC for each output data stream to be sent to a customer and for sending information regarding the available bandwidth for each said output data stream to recoding circuit which performs steps of decompressing and recompressing said output data stream to a bandwidth that matches or is less than the available bandwidth.

3. The process of claim 1 wherein said step of receiving one or more requests further comprises receiving one or more requests for video or other services other than video-on-demand, and wherein said step of mapping comprises mapping said one or more requests to one or more program identifier codes, P packet address information or other packet identifying information, and using said program identifier codes and/or P packet address information or other packet identifying information to cull out compressed video packets of video broadcast program(s) and/or service(s).

4. The process of claim 1 wherein said steps for culling out packets comprises the steps of culling out not only video packets encoding requested video-on-demand programs but also culling out compressed video packets of popular "pushed" programs regardless of whether there are any requests for said programs and organizing both said requested and said "pushed" programs into one or more output data streams for transmission over said HFC on one or more logical channels and subchannels.

5. A process for supplying video-on-demand programs to a plurality of customers over a shared transmission medium, comprising the steps:

receiving one or more input streams of MPEG or other compressed video data in packets from one or more video servers;

receiving one or more input streams of internet protocol format packets from one or more WAN servers or gateways or routers coupled to a wide area network;

receiving one or more input streams of data from a T-carrier interface circuit;

receiving one or more requests for video-on-demand programs and/or services encoded in data provided by said one or more WAN servers or gateways or routers or said T-carrier interface circuits, said one or more requests transmitted by said customers over an upstream logical channel on said transmission medium;

mapping said one or more requests to one or more program identifier codes, P packet address information or other packet identifying information, and using said program identifier codes for requested video-on-demand programs to send messages to one or more video servers telling them which video-on-demand data files to output, and using said program identifier codes and/or P packet address information or other packet identifying information to cull out compressed video packets of at least requested video-on-demand program(s) and/or service(s);

determining the customer from which each upstream request came;

determining how many programs and/or services each customer requested from the same customer premises;

looking up the number of tuners each customer has in his cable modem or gateway;

determining which logical channels and subchannels are available to send requested programs and/or services;

comparing the number of requested programs and/or services from each customer premises to the number of tuners in that customer's cable modem or gateway;

step for culling out packets bearing data of said components of all requested video programs and/or other services from streams of packets output by servers in response to requests sent thereto, and attempting to organize and transmit packets bearing data of all components of the programs and/or services requested by a customer on a number of channels that matches the number of tuners said customer has in his or her cable modem or gateway;

sending downstream messages to said customers telling them which logical channels and subchannels upon which they can find their requested video-on-demand program(s) and/or services; and receiving upstream internet protocol format and/or other format upstream data packets and routing them to the appropriate WAN server, gateway or router or said T-carrier interface circuitry.

6. The process of claim 5 further comprising the step of analyzing the bandwidth availability of logical channels and subchannels on said transmission medium for each output data stream output by said culling step, and for decompressing and recompressing any compressed video data packets to a bandwidth that matches or is less than the available bandwidth on the logical channel(s) and subchannel(s) on which the recompressed data stream is to be sent.

7. The process of claim 5 wherein said step of culling out packets further comprises the steps of moving or combining data already being transmitted to one or more customers on subchannels of one or more channels so as to free up a predetermined number of subchannels on a number of channels which equals the number of tuners a customer has, said predetermined number of subchannels being sufficient to carry all the components of all the video programs and/or other services said customer has ordered.

8. The process of claim 5 wherein said steps of culling out packets further comprises the step of organizing said culled out packets into one or more output data streams and further comprising the steps of culling out compressed video packets of popular "pushed" programs regardless of whether there are any requests for said programs and organizing both said requested and said "pushed" programs into one or more output data streams for transmission over said HFC on one or more logical channels and subchannels.

9. A head end cherrypicker apparatus comprising:

an upstream gateway for receiving upstream requests for video-on-demand programs and/or broadcast video programs and/or data services and sending messages to one or more servers that can supply the requested video-on-demand program(s) and/or data service(s);

a plurality of external inputs for receiving MPEG packets and Internet Protocol (P) packets from servers which supply said video-on-demand programs broadcast video programs and/or data services;

a plurality of cherrypicker culling switches each having a plurality of inputs and an output;

a plurality of distribution means, each coupled to some or all of said external inputs so as to receive MPEG packets and/or P packets on said external inputs to which said distribution means is coupled, for supplying said MPEG packets and/or P packets to inputs of said plurality of cherrypicker culling switches;

a plurality of recoding circuits, each having an input coupled to an output of a cherrypicker culling switch, and each having an output;

a plurality of downstream transmitters, each having an input coupled to an output of a recoding circuit to receive data to be transmitted downstream;

control means for receiving request data from said upstream gateway indicating said video program(s) and/or service(s) each customer has requested and for using said request data to generate control signals to said cherrypicker culling switches to control the culling process each switch performs, and for determining how many programs and/or service each customer has requested and how many tuners each customer has in his or her set top decoder or gateway and for determining which logical channels and subchannels are available for transmission of requested programs and/or services to each customer and for generating control signals to said recoding circuits to control recompression of data of requested programs and/or services into the available bandwidth and for generating control signals to said downstream transmitters to control which packets output from said recoding circuits are transmitted on which logical channels and subchannels, and for causing said transmitters to send downstream messages to a set top decoder or gateway of each customer who requested video programs and/or services indicating on which logical channels and subchannels said requested video programs and/or services can be found.

10. A head end cherrypicker apparatus comprising:

an upstream gateway for receiving upstream requests for video-on-demand programs and/or data services and sending messages to one or more servers that can supply the requested program(s) and/or service(s);

a plurality of external inputs for receiving MPEG packets and Internet Protocol (P) packets from servers which supply said video-on-demand programs and/or data services;

a plurality of cherrypicker culling switches having a plurality of inputs and an output;

a plurality of distribution means, each coupled to some or all of said external inputs, for receiving MPEG packets and packets on said external inputs to which said distribution means is coupled, and for supplying said packets to inputs of said plurality of cherrypicker culling switches to which said distribution means is coupled;

a plurality of recoding circuits, each having an input coupled to an output of a cherrypicker culling switch, and each having an output;

a plurality of downstream transmitters, each having an input to receive data from an output of one of said recoding circuits to be transmitted downstream and each having an output for coupling to a downstream transmission medium;

control means for receiving request data from said upstream gateway indicating said program(s) and/or service(s) each customer has requested and for using said request data to generate control signals to said cherrypicker culling switches to control the culling process each switch performs, and for determining how many programs and/or service each customer has requested and how many tuners each customer has in his or her set top decoder or gateway and for determining which logical channels and subchannels are available for transmission of requested programs and/or services to each customer and for determining if enough subchannels on an appropriate number of logical channels can be made available to deliver requested video programs and/or data services to a customer by moving and/or combining data on subchannels already in use by other customers, and for generating control signals to said recoding circuits to control decompression and recompression of data of requested programs and/or services into the available bandwidth, and for packetizing recompressed data received from said recoding circuits and sending each packet to an appropriate downstream transmitter, and for generating control signals to said downstream transmitters to control which packets are transmitted on which logical channels and subchannels, and for causing said transmitters to send downstream messages to a set top decoder or gateway of each customer who requested programs and/or services indicating on which logical channels and subchannels said requested programs and/or services can be found.

* * * * *